United States Patent
Narumi et al.

(10) Patent No.: US 7,349,315 B2
(45) Date of Patent: Mar. 25, 2008

(54) INFORMATION RECORDING METHOD, INFORMATION RECORDING DEVICE, OPTICAL INFORMATION RECORDING MEDIUM, PROGRAM FOR RECORDING INFORMATION AND STORAGE MEDIUM

(75) Inventors: Shinya Narumi, Yokohama (JP); Katsuyuki Yamada, Zama (JP); Masaki Kato, Sagamihara (JP); Hajime Yuzurihara, Odawara (JP); Hiroshi Deguchi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 595 days.

(21) Appl. No.: 10/926,866

(22) Filed: Aug. 26, 2004

(65) Prior Publication Data

US 2005/0078587 A1    Apr. 14, 2005

(30) Foreign Application Priority Data

Aug. 26, 2003    (JP) ............................. 2003-301277

(51) Int. Cl.
    G11B 7/00    (2006.01)
(52) U.S. Cl. ................................... 369/59.12
(58) Field of Classification Search ............. 369/59.11, 369/59.12, 116, 120, 121, 47.5, 47.51, 47.52, 369/47.53, 59.1, 59.24
    See application file for complete search history.

(56) References Cited

U.S. PATENT DOCUMENTS

| | | | |
|---|---|---|---|
| 6,177,167 B1 | 1/2001 | Yuzurihara et al. | |
| 6,280,810 B1 | 8/2001 | Nakamura et al. | |
| 6,388,978 B1 | 5/2002 | Ogawa et al. | |
| 6,391,417 B1 | 5/2002 | Yuzurihara et al. | |
| 6,426,936 B1 | 7/2002 | Shinotsuka et al. | |
| 6,445,669 B1 | 9/2002 | Hattori et al. | |
| 6,592,958 B2 | 7/2003 | Nakamura et al. | |
| 6,631,109 B2* | 10/2003 | Nakamura | 369/59.11 |
| 6,741,544 B1 | 5/2004 | Masaki et al. | |
| 6,757,232 B2 | 6/2004 | Yamada et al. | |
| 6,775,213 B2 | 8/2004 | Hattori et al. | |
| 7,149,154 B2* | 12/2006 | Kosuda et al. | 369/13.26 |
| 2001/0021154 A1 | 9/2001 | Katoh et al. | |
| 2001/0041240 A1 | 11/2001 | Ito et al. | |

(Continued)

FOREIGN PATENT DOCUMENTS

EP    0 557 584 A    9/1993

(Continued)

OTHER PUBLICATIONS

Communication Dated Jan. 27, 2006 in European Patent Application No. 04 020 139.4-1239.

(Continued)

*Primary Examiner*—Nabil Hindi
(74) *Attorney, Agent, or Firm*—Cooper & Dunham LLP

(57) ABSTRACT

An information recording method including irradiating an optical information recording medium containing a phase change recording layer on a substrate having a guide groove with continuous light of a laser beam having an erase power level Pe to determine a transition linear velocity Vo defined as a minimum linear velocity above which the following relationship is satisfied: Rr=Ra/Rb<1, wherein Rr represents a reflection light intensity ratio, and Ra and Rb represent a reflection light intensity measured after and before the irradiation of the optical information recording medium with the continuous light, respectively, prior to recording information in the optical information recording medium.

25 Claims, 9 Drawing Sheets

U.S. PATENT DOCUMENTS

| | | |
|---|---|---|
| 2002/0075789 A1 | 6/2002 | Katoh et al. |
| 2002/0098445 A1 | 7/2002 | Harigaya et al. |
| 2002/0110063 A1 | 8/2002 | Yamada et al. |
| 2002/0145963 A1 | 10/2002 | Narumi et al. |
| 2002/0155248 A1 | 10/2002 | Ito et al. |
| 2003/0003395 A1 | 1/2003 | Yuzurihara et al. |
| 2003/0008236 A1 | 1/2003 | Yamada et al. |
| 2003/0012917 A1 | 1/2003 | Harigaya et al. |
| 2003/0026195 A1 | 2/2003 | Kato |
| 2003/0043712 A1 | 3/2003 | Nakamura et al. |
| 2003/0044719 A1 | 3/2003 | Katoh et al. |
| 2003/0143365 A1 | 7/2003 | Ito et al. |
| 2003/0152006 A1 | 8/2003 | Ohkura et al. |
| 2003/0180495 A1 | 9/2003 | Ito et al. |
| 2003/0214888 A1 | 11/2003 | Kato et al. |
| 2003/0214902 A1 | 11/2003 | Yamada et al. |
| 2003/0227850 A1 | 12/2003 | Kato et al. |
| 2004/0017755 A1 | 1/2004 | Kato |
| 2004/0017768 A1 | 1/2004 | Hibino et al. |
| 2004/0076099 A1 | 4/2004 | Yuzurihara et al. |
| 2004/0085879 A1 | 5/2004 | Katoh et al. |
| 2004/0085880 A1 | 5/2004 | Katoh et al. |
| 2004/0105952 A1 | 6/2004 | Deguchi et al. |
| 2004/0114488 A1 | 6/2004 | Sawada et al. |
| 2004/0115559 A1 | 6/2004 | Kato et al. |
| 2004/0141447 A1 | 7/2004 | Yuzurihara et al. |
| 2004/0161700 A1 | 8/2004 | Abe et al. |

FOREIGN PATENT DOCUMENTS

| | | |
|---|---|---|
| EP | 1 058 248 A | 12/2000 |
| EP | 1 229 530 A | 8/2002 |
| JP | 11-115313 | 4/1999 |
| JP | 2001-283443 | 10/2001 |
| JP | 2002-358691 | 12/2002 |
| JP | 2003-109218 | 4/2003 |
| JP | 2003-322740 | 11/2003 |

OTHER PUBLICATIONS

U.S. Appl. No. 09/534,183, Onagi et al., filed Mar. 24, 2000

U.S. Appl. No. 09/569,501, Yamada et al., filed May 11, 2000.

* cited by examiner

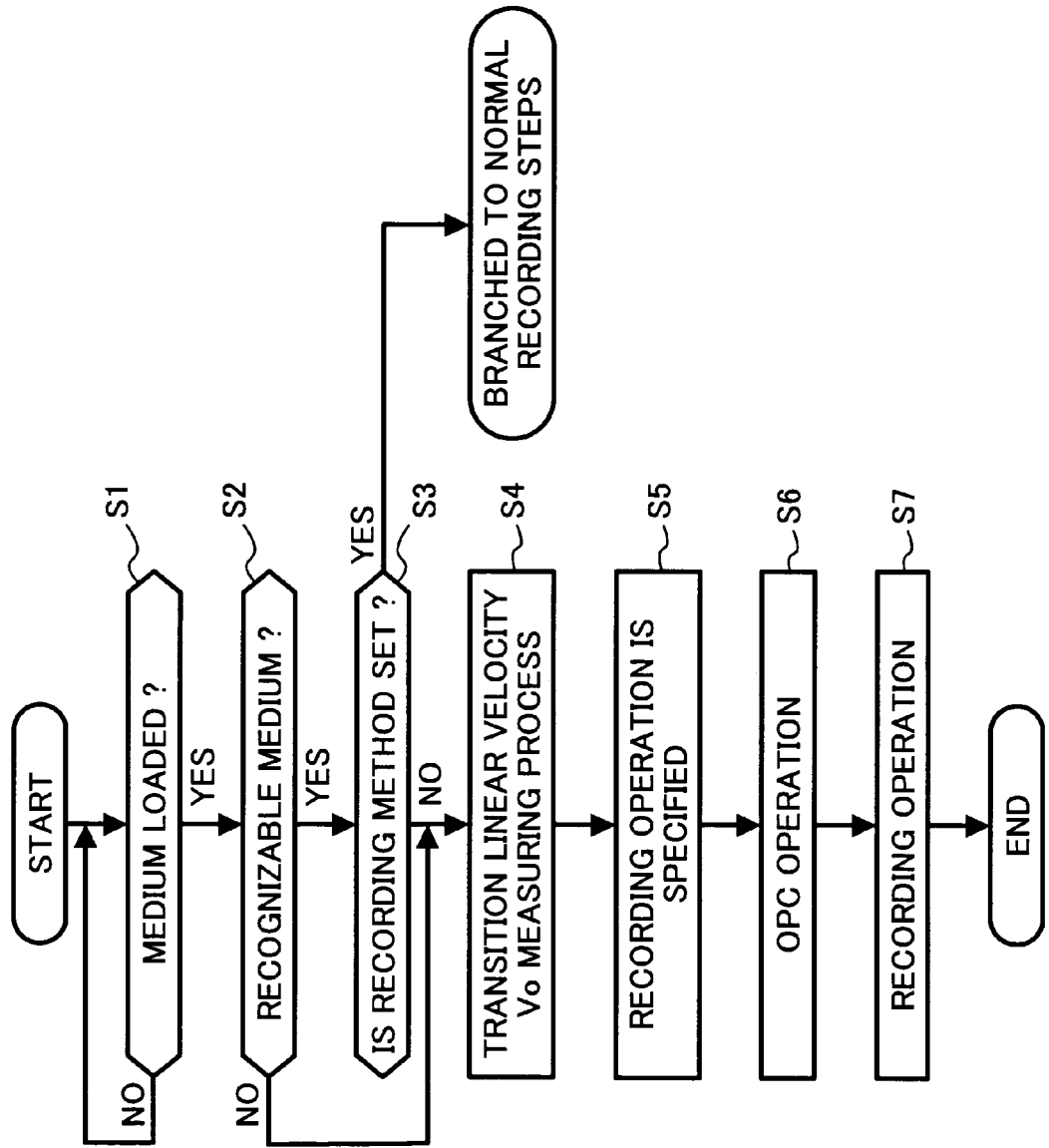

INFORMATION RECORDING METHOD, INFORMATION RECORDING DEVICE, OPTICAL INFORMATION RECORDING MEDIUM, PROGRAM FOR RECORDING INFORMATION AND STORAGE MEDIUM

BACKGROUND OF THE INVENTION

1. Field of the Invention

The present invention relates to an information recording method of recording information by irradiating a phase change recording layer material with a laser beam to cause phase changes therein. The present invention also relates to an information recording device, an optical information recording medium, a program for recording information and a storage medium.

2. Discussion of the Background

As optical information recording media in which information is recorded and played back by irradiation of a laser beam, there are optical information media dedicated for playback only, write-once optical information recording media in which information can be written only once and rewritable optical information recording media in which information can be overwritten.

Among the rewritable optical information recording media, CD-RWs, DVD-RWS, DVD+RWs and DVD-RAMs use phase change materials as recording layer materials to utilize phase changes between a crystal state and an amorphous state or a crystal state and a crystal state for recording information. Generally, these phase change optical information recording media use pulse patterns in which the power level of a laser beam is modulated into three levels (i.e., recording level (heating pulse), bias level (cooling pulse) and erasing level).

Detailed conditions for these pulse patterns vary depending on a recording linear velocity and rise-up pulse accuracy of the information recording device used, materials and structure of the optical information recording medium used, etc.

For example, when information is recorded in the same optical information medium using the same information recording device, the amount of energy required to raise the temperature of the recording layer in a high recording linear velocity range is large relative to that required to raise the temperature of the recording layer in a low recording linear velocity range. Therefore, recording is performed under conditions such that the recording power in the high recording linear velocity range is high relative to that in the low recording linear velocity range or the width time of a heating pulse in a multiple pulse portion in a recording pulse pattern which is constituted of a combination of the heating pulse and a cooling pulse, is expanded.

Thus, information on standard pulse patterns for each recording linear velocity is input in the optical information recording media in many cases. However, since there are differences among information recording devices, information is not always recorded in an optical information recording medium with good recording properties.

Optimum pulse patterns for recording vary depending on combinations of the information recording device and optical information recording medium used and the recording linear velocity. Therefore it is necessary to perform recording under conditions suitable for each combination to record information with good recording properties.

Currently, typical information recording devices set up recording conditions customized to combinations of an optical information recording medium and a recording linear velocity in advance and store the customized recording conditions in their memory. When an optical information recording medium is loaded in such an information recording device, in most cases the information recording device recognizes the kind of the optical information recording medium, reads the recording conditions set up therein and records information in the optical information recording medium under the recording conditions.

In addition, published unexamined Japanese Patent Application (hereinafter referred to as JOP) No. 2001-283443 discloses an optical information recording medium having a rewritable area in which individual drive control information is recorded to perform optical recording and playback under optimum conditions based on this drive control information.

Furthermore, JOP No. 2003-109218 discloses another recording method. That is, the recording method obtains no optimum parameter when an apparatus is the same as that used for preceding recording and optimum parameters to the apparatus have already been recorded on an information recording medium in the case that time does not elapse from the preceding recording by a prescribed period, and the recording method records information on the basis of the optimum parameters recorded on the medium. Or this method selects prescribed parameters to obtain optimum parameters and records information on the basis of the obtained optimum parameters. Thus the method can reduce the time required to obtain the optimum parameters.

However, it is impossible to use these methods for a case where an information recording device records information in an optical information recording medium which is marketed after the information recording device is marketed because the recording device does not recognize the recording medium. The same is true for a case where optimum recording conditions for the information recording device are not set in the recording medium. Even when information can be recorded in such a combination, one of the previously recorded conditions is used and therefore the recording is not performed with good recording properties in most cases. Consequently, applicability of these methods to various kinds of optical information recording media is limited.

Suppose that there is an optical information recording device which records information under one of the recording conditions previously recorded therein when an optical information recording medium storing no optimum recording conditions is set in the information recording device. If this information recording device has a maximum recording linear velocity VAh lower than that of the maximum recording linear velocity VMh of the information recording medium, the information recording device records information at the maximum recording linear velocity VAh instead of VMh in the optical information recording medium under one of the conditions previously recorded in the information recording device. That is, information is recorded in the optical information recording medium at the linear velocity VAh under non-optimum recording power and non-optimum pulse pattern conditions. When such poor recording is performed, data which have been recorded in the optical information recording medium may be damaged, or there is a possibility that the optical information recording medium cannot be mounted on the information recording device.

As discussed above, it is disadvantageous to use an optical information recording medium which is not recognized by an information recording device or in which optimum recording method therefor is not recorded, namely such a recording medium is not suitable for a practical use. Thus, since a new optical information recording medium having an improved maximum linear velocity as mentioned above is brought into the market a certain period of time after an information recording device is marketed, the life of the information recording device surely comes to an end at that time. This results in waste of a large number of information recording devices.

To avoid this problem, it is necessary for an information recording device to record information with good recording properties even in an optical information recording medium unrecognized thereby. To achieve this, information on the recording methods stored in an information recording device is necessary to be overwritten to recognize the optical information recording medium as known medium. Currently, information recording device manufacturers provide a web site from which users are guided to access and install version upgrade software of the firmware on their own. This installation is dependent on free will and skills of each user and thus the actual installation ratio is low. Therefore, this is not practical.

In addition, whenever a new optical information recording medium is introduced into the market, the information recording device manufacturers are required to take measures for the new optical information recording medium. This is a heavy burden for not only manufacturers who need to prepare upgraded firmware but also users who are required to install the new upgraded firmware. Thus, this is also not practical in terms of this point.

Because of these reasons, a need still exists for a method of setting up conditions under which an information recording device can record information with good recording properties in an information recording medium which is not recognized by the information recording device. Further, as mentioned above, the optimum recording conditions vary depending on materials, structures and specifications of the information recording medium and structures and specifications of the information recording device. Therefore, to easily obtain settings for recording information with good signal characteristics in an optical information recording medium unrecognized by an information recording device, it is preferred to determine characteristic values of the optical information recording medium, serving as a definite indicator for a setting method of determining optimum recording conditions.

SUMMARY OF THE INVENTION

Accordingly, an object of the present invention is to provide an information recording method for selecting optimum information recording conditions for each combination of optical information recording media and information recording devices to record information with good recording properties in the optical information recording medium to prolong the commercial life of the information recording devices even when the optical information recording device does not recognize the optical information recording medium. Another object of the present invention is to provide the information recording device and the optical information recording medium which record information using the information recording method. Yet another object of the present invention is to provide a program of performing a selection process of optimum information recording conditions, which is installed in a computer contained in the information recording device to perform a process of recording information in the optical information recording medium with good recording properties. Still another object of the present invention is to provide a computer-readable storage medium storing instructions for performing the method.

Briefly these objects and other objects of the present invention as hereinafter will become more readily apparent can be attained by an information recording method including the following steps: first irradiating an optical information recording medium including a phase change recording layer on a substrate having a guide groove with continuous light of a laser beam having an erase power level $Pe$ to determine a transition linear velocity $Vo$ defined as a minimum linear velocity, above which the following relationship is satisfied: $Rr=Ra/Rb<1$, wherein $Rr$ represents a reflection light intensity ratio, and $Ra$ and $Rb$ represent a reflection light intensity measured after and before the irradiation of the optical information recording medium with the continuous light, respectively; and then second irradiating the optical information recording medium with a laser beam, which is modulated by a pulse width modulation (PWM) system so as to have at least a recording power level $Pw$ and the erase power level $Pe$, to form marks and spaces therebetween having a length of $nT$ and in the optical information recording medium by causing a phase change in the phase change recording layer, wherein $n$ represents a natural number and $T$ represents a basic clock cycle.

It is preferred that, in the information recording method mentioned above, the erase power level $Pe$ of the continuous light of the laser beam with which the medium is irradiated to determine the transition linear velocity $Vo$ satisfies the following relationships: $(Pwo/2) \leq Pe \leq (Pwo/2) \times 1.5$, wherein $Pwo$ is an optimum recording power level for use in recording information with intensity modulated pulse patterns.

It is still further preferred that the information recording method immediately mentioned above further includes performing trial recording in the optical information recording medium by an Optimum Power Control (OPC) method to determine an optimum recording power level $Pwo$ of the modulated laser beam.

It is still further preferred that, in the information recording method firstly mentioned above, the first-mentioned irradiating includes irradiating a portion outside a data area of the optical information recording medium while a rotation speed of the optical information recording medium is changed to obtain the reflection light intensity ratio $Rr$ at different linear velocities and thereby determine the transition linear velocity $Vo$.

It is still further preferred that the information recording method firstly mentioned above includes irradiating an inner portion to a peripheral portion of the optical information recording medium while the optical information recording medium is rotated by a Constant Angular Velocity (CAV) system to obtain the reflection light intensity ratio $Rr$ at different linear velocities and thereby determine the transition linear velocity $Vo$.

It is still further preferred that, in the information recording method firstly mentioned above, the second-mentioned irradiation is performed at a linear velocity in a linear velocity range not above the transition linear velocity $Vo$.

It is still further preferred that, in the information recording method firstly mentioned above, the second-mentioned irradiation is performed at a linear velocity in a linear velocity range above the transition linear velocity $Vo$.

It is still further preferred that, in the information recording method firstly mentioned above, the second-mentioned irradiation is performed by a CAV system or a zone CAV (ZCAV) system at a linear velocity in a range including the transition linear velocity $Vo$, and wherein an erase power level ratio $\epsilon$, which is a ratio of the erase power level $Pe$ to the recording power level Pw, is changed at a linear velocity below the transition linear velocity Vo.

It is still further preferred that, in the information recording method immediately mentioned above, the second-mentioned irradiation is performed while the following relationship is satisfied: $\epsilon H/\epsilon L<1$, wherein $\epsilon H$ and $\epsilon L$ are an erase power level ratio in a linear velocity range above the transition linear velocity Vo and an erase power level ratio in a linear velocity range below the transition linear velocity Vo, respectively.

It is still further preferred that, in the information recording method firstly mentioned above, the linear velocity is changed based on preformatted information encoded in the optical information recording medium.

It is still further preferred that, in the information recording method firstly mentioned above, the erase power level Pe of the laser beam in the first-mentioned irradiation is determined based on preformatted information encoded in the optical information recording medium.

As another aspect of the present invention, an optical information recording medium is provided which includes a substrate having a wobbling guide groove and a phase change recording layer on the substrate. The optical information recording medium contains encoded preformatted information on at least one of a test linear velocity range and a range of an erase power level Pe of continuous light for use in determining a transition linear velocity Vo defined as a minimum linear velocity above which the following relationship is satisfied: $Rr=Ra/Rb<1$, wherein Rr represents a reflection ratio, and Ra and Rb represent a reflection light intensity measured after and before the irradiation of the optical information recording medium with the continuous light, respectively.

It is preferred that, for the optical information recording medium, the preformatted information is encoded in the wobbling guide groove.

It is still further preferred that, for the optical information recording medium, the preformatted information is recorded in the wobbling guide groove with phase modulation.

As another aspect of the present invention, an information recording device is provided which contains a rotation driving mechanism configured to rotate an optical information recording medium including a phase change recording layer on a substrate having a guide groove, a laser beam source configured to emit a laser beam irradiated on the optical information recording medium, and a light source driving device configured to drive the laser beam source to emit the laser beam. The information recording device further contains a transition linear velocity measuring device configured to first irradiate the optical information recording medium with continuous light of a laser beam having an erase power level Pe to determine a transition linear velocity Vo defined as a minimum linear velocity, above which the following relationship is satisfied: $Rr=Ra/Rb<1$, wherein Rr represents a reflection ratio, and Ra and Rb represent a reflection light intensity measured after and before the irradiation of the optical information recording medium with the continuous light, respectively. The information recording device still further contains a recording operation performing device configured to second irradiate the optical information recording medium with a laser beam, which is modulated by a pulse width modulation (PWM) system so as to have at least a recording power level Pw and an erase power level Pe, to form marks and spaces therebetween having a length of nT and in the optical information recording medium by causing a phase change in the phase change recording layer, wherein n represents a natural number and T represents a basic clock cycle, while controlling a relative linear velocity between the optical information recording medium driven rotationally and the laser beam irradiating the medium and emission of the laser beam by the light source driving device according to PWM system. The information recording device also includes a recording operation controlling device configured to control recording operation performance by the recording operation performing device according to the transition linear velocity Vo determined by the transition linear velocity measuring device.

It is preferred that, in the information recording device mentioned above, the transition linear velocity measuring device controls the light source driving device. Thereby the erase power level Pe of the continuous light of the laser beam with which the medium is irradiated to determine the transition linear velocity Vo satisfies the following relationships: $(Pwo/2) \leq Pe \leq (Pwo/2) \times 1.5$, wherein Pwo is an optimum recording power level for use in recording information with intensity modulated pulse patterns.

It is preferred that the information recording device mentioned above further includes an Optimum Power Control (OPC) device to perform trial recording in the optical information recording medium by an Optimum Power Control (OPC) method prior to recording operation to determine the optimum recording power level Pwo of the modulated laser beam which is used by the transition linear velocity measuring device to specify the erase power level Pe.

It is still further preferred that, in the information recording device mentioned above, the transition linear velocity measuring device irradiates a portion outside a data area of the optical information recording medium while a rotation speed of the optical information recording medium is changed to obtain the reflection light intensity ratio Rr at different linear velocities and thereby determine the transition linear velocity Vo.

It is still further preferred that, in the information recording device mentioned above, the transition linear velocity measuring device irradiates an inner portion to a peripheral portion of the optical information recording medium while the optical information recording medium is rotated by a Constant Angular Velocity (CAV) system to obtain the reflection light intensity ratio Rr at different linear velocities and thereby determine the transition linear velocity Vo.

It is still further preferred that, in the information recording device mentioned above, the recording operation performing device controls the second-mentioned irradiation to be performed at a linear velocity in a linear velocity range not above the transition linear velocity Vo.

It is still further preferred that, in the information recording device mentioned above, the recording operation controlling device controls the second-mentioned irradiation to be performed at a linear velocity in a linear velocity range above the transition linear velocity Vo.

It is still further preferred that, in the information recording device mentioned above, the recording operation controlling device controls the second-mentioned irradiation to be performed by a CAV system or a zone CAV (ZCAV) system at a linear velocity in a range including the transition linear velocity Vo, and wherein an erase power level ratio $\epsilon$, which is a ratio of the erase power level Pe to the recording power level Pw, is changed at a linear velocity below the transition linear velocity Vo.

It is still further preferred that, in the information recording device immediately mentioned above, the second-mentioned irradiation is performed while the following relationship is satisfied: $\epsilon H/\epsilon L<1$, wherein $\epsilon H$ and $\epsilon L$ are an erase power level ratio in a linear velocity range above the transition linear velocity Vo and an erase power level ratio in a linear velocity range below the transition linear velocity Vo, respectively.

It is still further preferred that, in the information recording device firstly mentioned above, the linear velocity is changed based on preformatted information encoded in the optical information recording medium.

It is still further preferred that, in the information recording device firstly mentioned above, the erase power level Pe of the laser beam in the first-mentioned irradiation is determined based on preformatted information encoded in the optical information recording medium.

As another aspect of the present invention, a program for recording information is provided which includes the processes of performing a transition linear velocity measuring process by first irradiating an optical information recording medium including a phase change recording layer on a substrate having a guide groove with continuous light of a laser beam having an erase power level Pe to determine a transition linear velocity Vo defined as a minimum linear velocity above which the following relationship is satisfied: Rr=Ra/Rb<1, wherein Rr represents a reflection light intensity ratio, and Ra and Rb represent a reflection light intensity measured after and before the irradiation of the optical information recording medium with the continuous light, respectively and a process of recording information in the optical information recording medium. These processes are performed by a computer in which the program is installed and which is contained in an information recording device which records information in the optical information recording medium by second irradiating the optical information recording medium with a laser beam, which is modulated by a pulse width modulation (PWM) system so as to have at least a recording power level Pw and the erase power level Pe, to form marks and spaces therebetween having a length of nT and in the optical information recording medium by causing a phase change in the phase change recording layer, wherein n represents a natural number and T represents a basic clock cycle.

As another aspect of the present invention, a computer readable storage medium storing the program mentioned above is provided.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 9 is a schematic flow chart illustrating the information recording method of the present invention.

DETAILED DESCRIPTION OF THE INVENTION

Embodiments of the present invention will be described below in detail with reference to accompanying drawings.

Configuration Example of the Information Recording Device

Figure 1:
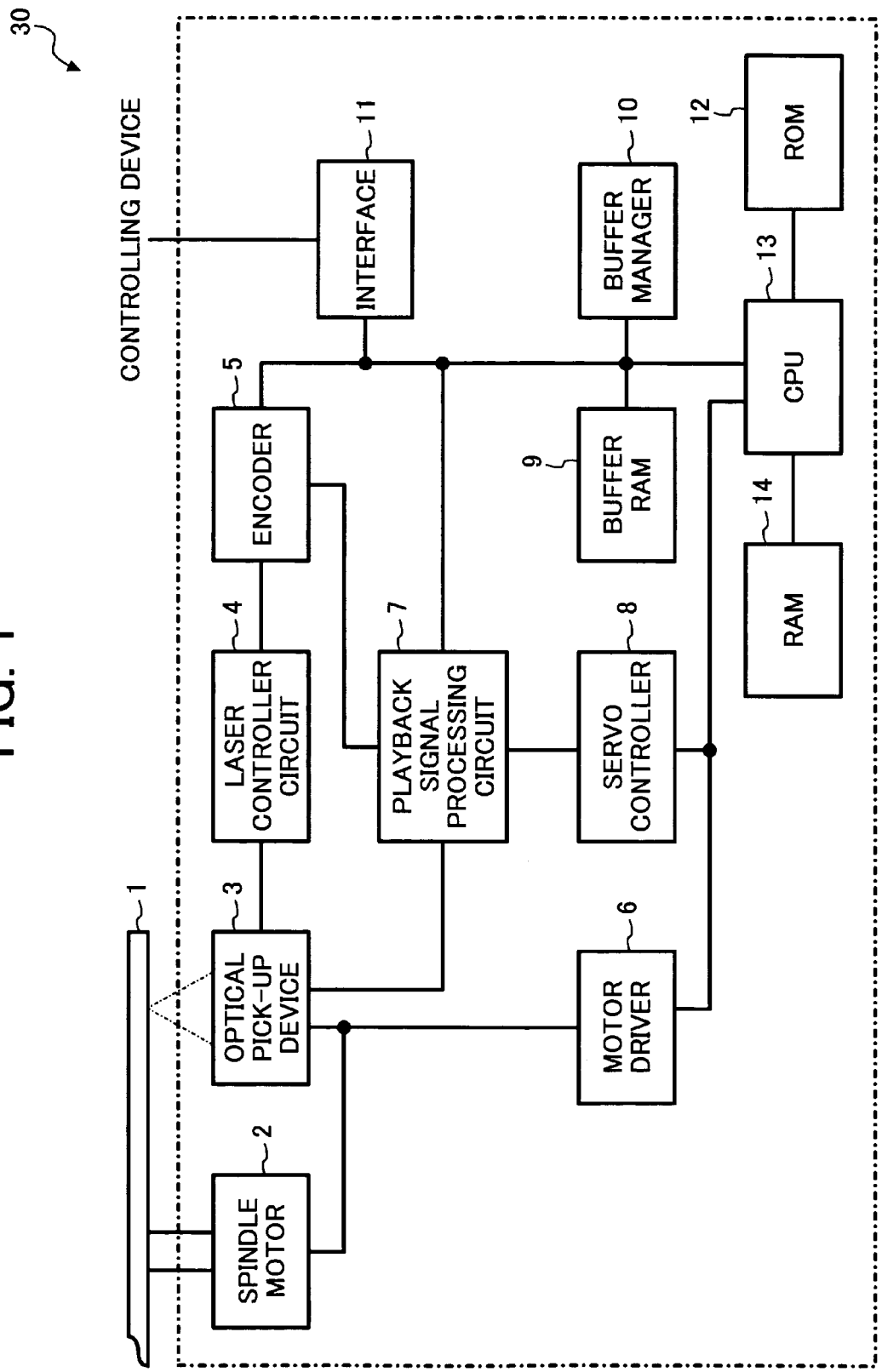
FIG. 1 is a schematic block diagram illustrating a hardware structure of the information recording device of an embodiment of the present invention.

FIG. 1 is a schematic block diagram illustrating an example of the hardware structure 30 of the information recording device using the information recording method of the present invention. This information recording device, for example, is an optical disc drive for CDs and DVDs and is connected to a controlling device (not shown) such as personal computers for use. This information recording device contains a spindle motor 2 for rotatably driving an optical information recording medium 1 such as CDs and DVDs, an optical pickup device 3, a laser control circuit 4, an encoder 5, a motor driver 6, a playback signal processing circuit 7, a servo controller 8, a buffer Random Access Memory (RAM) 9, a buffer manager 10, an interface 11, a Read Only Memory (ROM) 12, a Central Processing Unit (CPU) 13 and a RAM 14. Connection lines in FIG. 1 indicate representative flows of signals and information and do not represent all the connection relationships between each block.

The optical pickup device 3 includes a semiconductor laser as light source, an optical system which guides light flux emitted by the semiconductor laser to a recording surface of the optical information recording medium 1 and the light flux reflected at the recording surface to a predetermined receiving position, a photo acceptance unit disposed at the receiving position to receive the reflected light flux, and a driving system including a focusing actuator, a tracking actuator and a seek motor (each of them is not shown). The photo acceptance unit outputs an electric current (electric signals) according to the amount of light received at the photoacceptance unit to the playback signal processing circuit 7.

The playback signal processing circuit 7 converts the electric signals, (i.e., output signals of the optical pickup device 3), into voltage signals and detects wobble signals, RF signals and servo signals (i.e., focus error signals, track error signals, etc.) based on the voltage signals. The playback signal processing circuit 7 extracts Address In Pregroove (ADIP) information and synchronization signals from the wobble signals. The extracted ADIP information and synchronization signals are output to the CPU 13 and the encoder 5, respectively. Further, the playback signal processing circuit 7 performs error correcting processing for the RF signals and then stores the results in the buffer RAM 9 via the buffer manager 10. The focus error signals and the track error signals are output from the playback signals processing circuit 7 to the servo controller 8.

The servo controller 8 generates control signals to control the focusing actuator in the optical pickup device 3 according to the focus error signals. Further, the servo controller 8 generates control signals to control the tracking actuator in the optical pickup device 3 according to the track error signals. Each control signal is output from the servo controller 8 to the motor driver 6.

The buffer manager 10 manages outputs and inputs of data to the buffer RAM 9 and notifies the CPU 13 when the amount of the accumulated data reaches a predetermined value.

The motor driver 6 drives the focusing actuator and the tracking actuator in the optical pickup device 3 according to the control signals from the servo controller 8. In addition, the motor drive 6 rotates the optical information recording medium 1 by constant linear velocity (CLV) system or constant angular velocity (CAV) system (i.e., totally CAV system or zone CAV) while controlling the spindle motor 2 according to instructions from the CPU 13. Further, the motor driver 6 drives the seek motor in the optical pickup device 3 according to instructions from the CUP 13 to control the position of the optical pickup device 3 in the sledge direction (i.e., radius direction of the optical information recording medium 1).

The encoder 5 adds error correction codes according to instruction from the CPU 13 to the data extracted from the buffer RAM 9 via the buffer manager 10. Further, the encoder 5 generates writing data to the optical information recording medium 1 and outputs the data to the laser control circuit 4 while synchronizing to the synchronization signals from the playback signal processing circuit 7.

The laser control circuit 4 controls the output power of the semiconductor laser of the optical pickup device 3 according to the writing data from the encoder 5 and instructions from the CPU 13.

The interface 11 is a two way communications interface to the controlling device and compliant with standard interfaces of AT Attachment Packet Interface (ATAPI), Small Computer System Interface (SCSI), etc.

The ROM 12 functioning as a recording medium stores programs including a program for information recording written by codes the CPU 13 can read. The program for information recording will be described later. When the information recording device is switched on, the program is loaded or installed to a main memory (not shown) and the CPU 13 controls operations of each portion mentioned above according to the program and temporarily saves data necessary for the control in the RAM 14. The CPU 13 constitutes the computer in the information recording device together with the ROM 12 and the RAM 14.

Example of Optical Information Recording Medium

Figure 2:
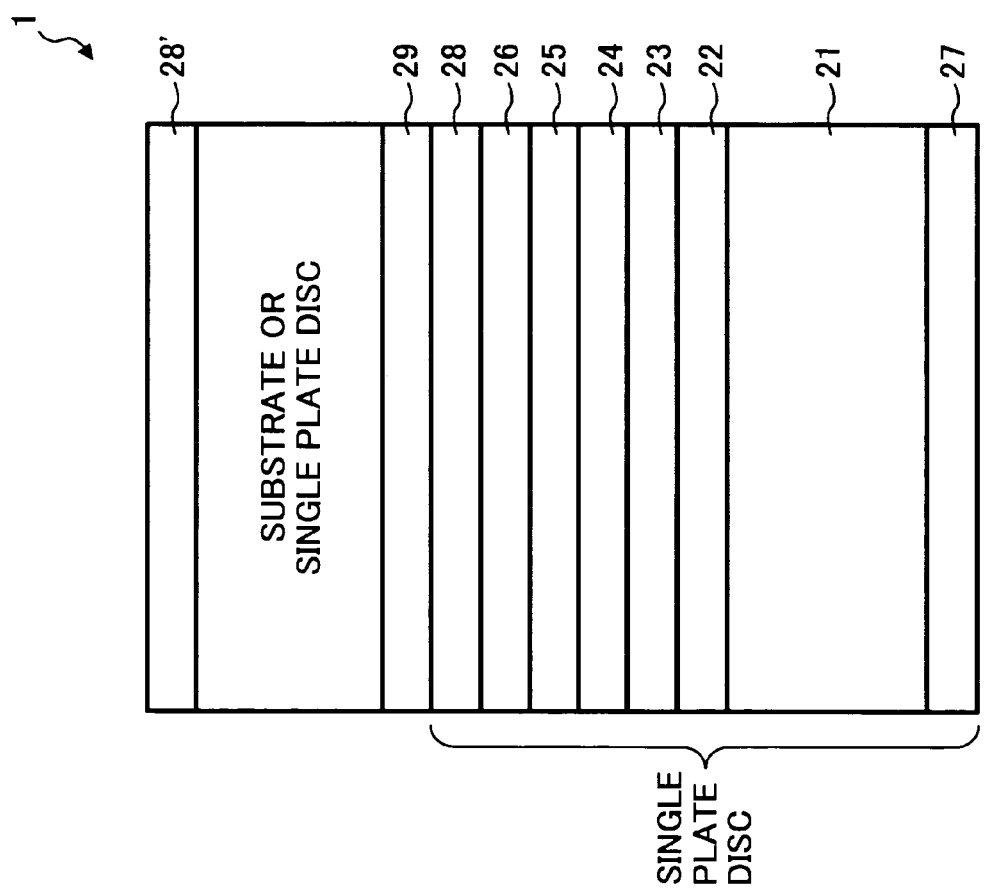
FIG. 2 is a cross section illustrating a configuration of the phase change optical information recording medium.

CDs and DVDs can be used as the optical information recording medium 1. Especially in this embodiment, the use of phase change type optical information recording media is considered. FIG. 2 illustrates an example of the optical information recording medium 1 suitable for application to an information recording method described later. The basic configuration of the optical information recording medium 1 includes a transparent substrate 21 having spiral or concentric guide grooves on one side on which a lower protective layer 22, a recording layer 23, an upper protective layer 24, a reflective layer 25 and an overcoating layer 26 are overlaid. Further, a printing layer 28 can optionally be overlaid on the overcoating layer 26. Furthermore, a hard coating layer 27 can optionally be attached to the other side of the substrate 21.

Also, the single plate disc mentioned above can be attached to another disc with an adhesive layer 29 therebetween. Another similar single plate disc or transparent substrate can be used as the disc attached to the single plate disc. In addition, a printing layer 28 can be overlaid on the opposite side of the disc or substrate attached to the single plate disc instead of forming the printing layer 28 on the layer 26.

Specific materials for use in the substrate 21 include ceramics or resins. Resin substrates are preferred in terms of moldability and cost. Suitable examples of such resins include polycarbonate resins, acrylic resins, epoxy resins, polystyrene resins, acrylic nitrile-polystyrene copolymer resins, polyethylene resins, polypropylene resins, silicone resins, resins containing fluorine, ABS resins and urethane resins. Polycarbonate resins and acrylic resins are preferred in terms of moldability, optical characteristics and cost.

Phase change type recording materials including Sb and Te, each of which can have a stable or metastable state, are suitable as materials for the recording layer 23 since the materials are excellent in recording (changing to amorphous state) sensitivity and speed, erasing (crystallization) sensitivity and speed, and erasing ratio. Recording and erasing sensitivity, signal characteristics and reliability can be improved by adding elements such as Ga, Ge, Ag, In, Bi, C, N, O, Si, and S to the SbTe materials. Therefore, it is preferred to control the optimum recording linear velocity and to secure playback stability and life length of recorded signals by selecting the added elements and adjusting the composition ratio thereof for targeted recording linear velocities and linear velocity areas. In the phase change optical information recording medium 1 for use in embodiments of the present invention, Ag and/or Ge, Ga and/or In, Sb and Te are selected as material components for the recording layer to satisfy these characteristics in a comprehensive manner. Materials having a content ratio (i.e., (Ag and/or Ge)$\alpha$(Ga and/or In)$\beta$Sb$\gamma$Te$\delta$), wherein $\alpha$, $\beta$, $\gamma$ and $\delta$ are atomic %) satisfying the following relationships are preferred in the light of playback stability and life length of the signals: $\alpha+\beta+\gamma+\delta=100$, $0<\alpha\leq6$, $2\leq\beta\leq10$, $60\leq\gamma\leq85$, and $15\leq\delta\leq27$.

The recording layer 23 made of phase change materials preferably has a thickness of from 5 to 40 nm, and more preferably from 10 to 25 nm when initial characteristics such as jitter, overwriting characteristics and mass productivity are considered. When the recording layer is too thin, light absorption power thereof extremely deteriorates and such a recording layer fails to function properly. When the recording layer is too thick, rapid and uniform phase change is hard to occur.

The recording layer 23 of a phase change type can be formed by various kinds of vapor phase growth methods such as vacuum deposition methods, sputtering methods, plasma chemical vapor deposition (CVD) methods, light CVD methods, ion plating methods and electron beam vapor deposition methods. Among them, sputtering methods are excellent in terms of mass productivity, quality of film, etc.

A lower protective layer 22 and an upper protective layer 24 are formed to sandwich the recording layer 23. Suitable materials for the protective layers 22 and 24 include metal oxides such as SiO, $SiO_2$, ZnO, $SnO_2$, $Al_2O_3$, $TiO_2$, $In_2O_3$, MgO and $ZrO_2$, nitrides such as $Si_3N_4$, AlN, TiN, BN, and ZrN, sulfides such as ZnS, $In_2S_3$ and $TaS_4$, carbides or diamond-like carbons such as SiC, TaC, BC, WC, TiC and ZrC and compounds thereof. These materials can be used singly or in combination to form the protective layers. These materials may include impurities where appropriate. Further, these materials are allowed to form not only a single layer structure but also an accumulated multiple layer structure.

The protective layers 22 and 24 need to have a high melting point relative to that of the phase change type recording layer. These protective layers 22 and 24 can be formed by various kinds of vapor phase growth methods such as vacuum deposition methods, sputtering methods, plasma chemical vapor deposition (CVD) methods, light CVD methods, ion plating methods and electron beam vapor deposition methods. Among them, sputtering methods are excellent in terms of mass productivity, quality of film, etc.

The thickness of the protective layers 22 and 24 affects reflectivity, modulation level and recording sensitivity. To have good values for these characteristics, the lower protective layer 22 needs to have a thickness of from 30 to 200 nm. Further, to obtain excellent signal characteristics, the thickness of the lower protective layer 22 preferably is from 40 to 100 nm. The upper protective layer 24 needs to have a thickness of from 5 to 40 nm, and preferably from 7 to 30 nm. When the upper protective layer 24 is too thin, such an upper protective layer does not function as heat protective layer and degrades the recording sensitivity. In contrast, when the upper protective layer 24 is too thick, interface detachment easily occurs and repetitive recording ability deteriorates.

Metal materials such as Al, Au, Ag, Cu, Ta, Ti and W or alloyed metals including these elements can be used for the reflective layer 25. To improve corrosion resistance and thermal conductivity, elements such as Cr, Ti, Si, Cu, Ag, Pd and Ta can be added to the materials mentioned above. Suitable addition ratio thereof is from 0.3 to 2 atomic %. When the addition ratio is too small, the material obtained has a poor corrosion resistance. When the addition ratio is too large, the thermal conductivity of the material obtained is too low and thus forming amorphous state is difficult. This reflective layer 25 can be formed by various kinds of vapor phase growth methods such as vacuum deposition methods, sputtering methods, plasma chemical vapor deposition (CVD) methods, light CVD methods, ion plating methods and electron beam vapor deposition methods. Suitable thickness of the alloyed metal or metal layer is from 50 to 200 nm and preferably from 70 to 160 nm. Further, multiple alloyed metal or metal layers are also allowed. When such multiple layers are formed, each layer needs to have a thickness of at least 10 nm and the total thickness of the multiple layers is preferably from 50 to 160 nm.

On the reflective layer 25, the overcoating layer 26 is formed for antioxidization of the reflective layer 25. The overcoating layer 26 is typically made of ultraviolet curing resins manufactured by spin coating. Suitable thickness of the overcoating layer 25 is from 3 to 15 µm. When the thickness of the overcoating layer 26 is too thin and a printing layer is formed thereon, errors may frequently occur. In contrast, when the thickness of the overcoating layer 26 is too thick, internal stress thereof becomes large and thus mechanical characteristics of the disc are greatly affected.

The hard coating layer 27 is typically made of ultraviolet curing resins manufactured by spin coating. Suitable thickness of the hard coating layer 27 is from 2 to 6 µm. When the thickness of the hard coating layer 27 is too thin, sufficient anti-abrasion characteristics are not obtained. When the thickness of the hard coating layer 27 is too thick, internal stress thereof becomes large and thus mechanical characteristics of the disc are greatly affected. The hardness of the hard coating layer is necessary to be at least pencil hardness H, meaning that a serious scar is not formed when a material is abraded by a cloth. To prevent the hard coating layer 27 from attracting dust, it is effective to mix a conductive material for anti-charging where appropriate.

The printing layer 28 has functions of securing abrasion resistance, printing labels such as brand names, forming an ink affinity layer for an inkjet printer, etc. The printing layer 28 is typically made of ultraviolet resins manufactured by screen printing method. Suitable thickness of the printing layer 28 is from 3 to 50 µm. When the printing layer 28 is too thin, the layer formed is not uniform. When the printing layer 28 is too thick, internal stress thereof becomes large and thus mechanical characteristics of the disc are greatly affected.

For the adhesive layer 29, ultraviolet curing resins, hot melt adhesive agents and silicone resins can be used. Such materials for the adhesive layer 29 are applied to the overcoating layer 26 or the printing layer 28 by the methods such as spin coating methods, roll coating methods and screen printing methods selected according to the material used. After being subject to treatments of ultraviolet irradiation, heating, pressing, etc., the adhesive layer 29 is attached to the disc on the other side. A similar single plate disc or a transparent substrate can be used as the disc on the other side. It is not always necessary to apply the materials for the adhesive layer 29 to the attachment side of the disc on the other side. Also an adhesive sheet can be used as the adhesive layer 29. There is no specific limit to the thickness of the adhesive layer 29. However, when applicability of materials, curing properties and effect on the mechanical characteristics of a disc are considered, the thickness is preferred to be from 5 to 100 µm. There is no specific limit to the area of the attachment. However, when this adhesive layer 29 is applied to an optical information recording medium compatible with DVDs and/or CDs, suitable radius of the inner circular end thereof is 15 to 40 mm and preferably from 15 to 30 mm to secure the strength of adhesiveness.

With Regard to Recording Strategy

Therefore, when such an optical information recording medium 1 is used, mechanism of recording and playback of information therein is as follows: rotationally drive the optical information recording medium 1 with the spindle motor 2; at the same time drive the semiconductor laser using the laser driving circuit of the optical pickup device 3; irradiate the recording layer 23 of the optical information recording medium 1 with a laser beam having various kinds of pulse patterns containing a front pulse portion, a multiple pulse portion and an end pulse portion as illustrated in FIGS. 3 to 7 via the optical system to cause an optical change (i.e., phase change) in the recording layer 23; and receive the reflection light from the optical information recording medium 1 at the optical pickup device 3.

As recording system, a system of recording signals as width of marks on the recording layer 23 of the optical information recording medium 1 (i.e., Pulse Width Modulation (PWM) recording (mark edge recording) system) is adopted. Signals recorded are modulated by modulation system such as Eight to Fourteen Modulation (EFM) for use in recording information in compact discs (CD) and its improved modulation system (EFM+) using the clock of the modulation portion and then recorded.

When recording is performed by PWM recording system, the recording pulse for recording (inclusive of overwriting; hereinafter recording means the same) a "0" signal having a signal width of nT (n is a predetermined value, T is a clock time, i.e., time equivalent to the cycle of the clock for use in signal modulation) after modulation is a continuous light beam having a power of the erase power level Pe (erasing pulse). There are several kinds of patterns (recording pulse strategy) of recording pulses for recording a "1" signal having a signal width of nT after modulation. Several examples of them are as follows: (1) the pattern is constituted of a front pulse portion, a multiple pulse portion and an end pulse portion. The front pulse portion (heating pulse portion) has a time length of xT and a power level of Pw (heating pulse). The multiple pulse portion has (n−n') high level pulse portions and low level pulse portions (cooling pulse) therebetween. Characters n and n' are positive numbers and have the following relationship: n'≦n. Each high level portion has a power level of Pw' and a time length of yT. Each low level pulse portion has a power level of Pb and a time length of (1−y)T. The end pulse portion has a power level of Pb' and a time length of zT. The relationship among the power levels are: Pw≧Pe≧Pb and Pw'≧Pe≧Pb'.

Figure 3:
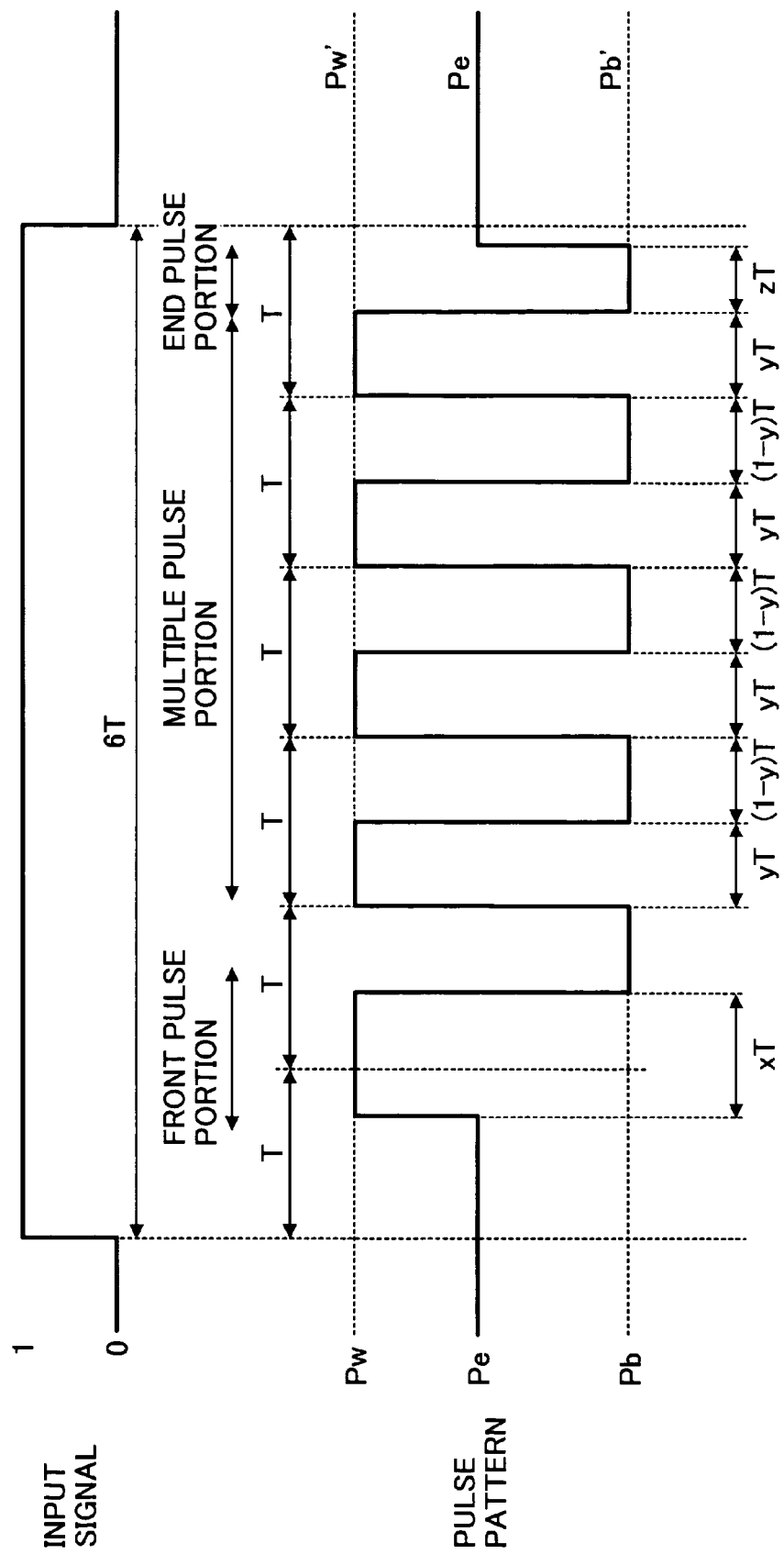
FIG. 3 is a wave form chart illustrating an example of the recording pulse strategy when n=6, and n'=2.
Figure 4:
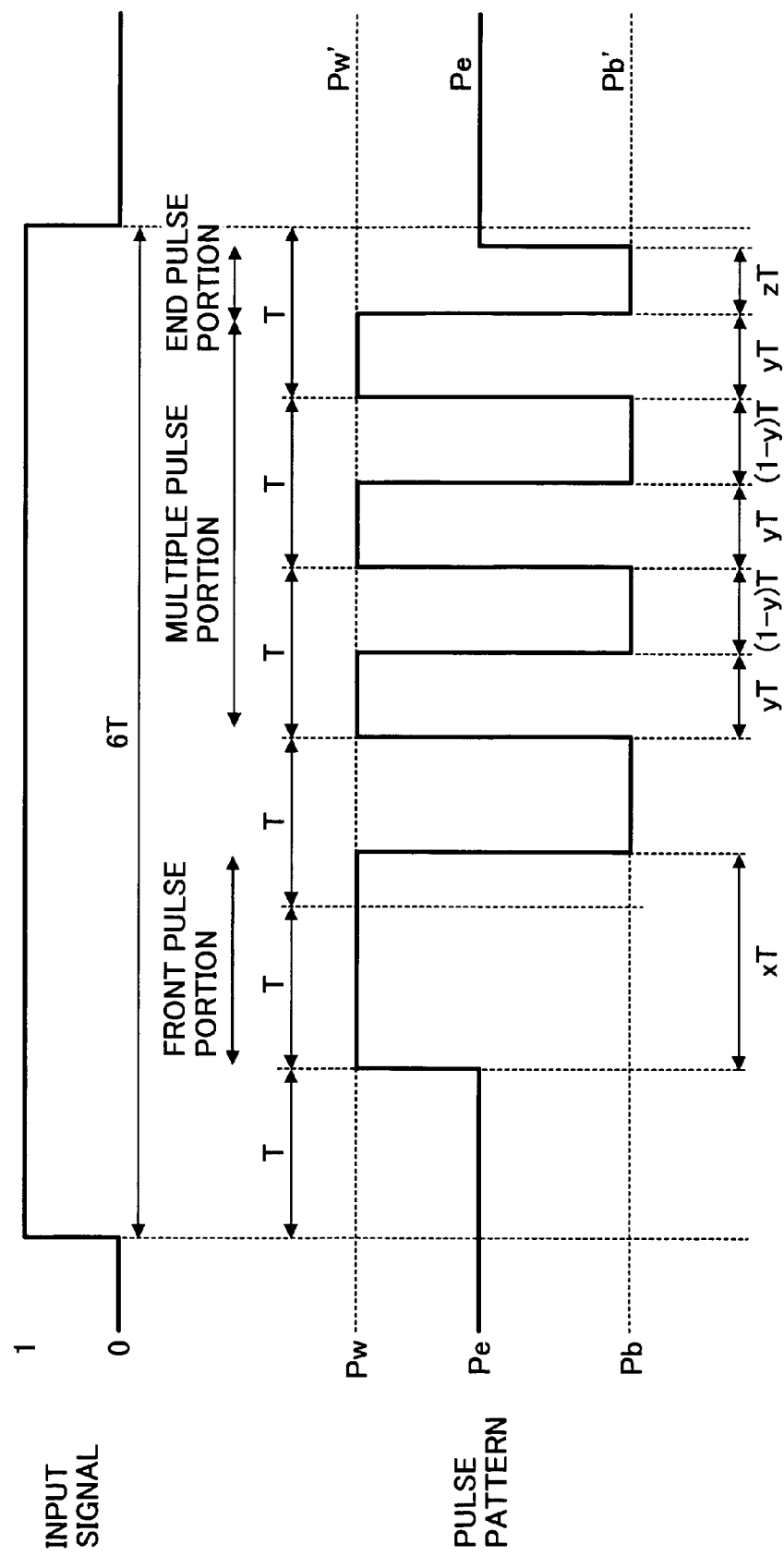
FIG. 4 is a wave form chart illustrating an example of the recording pulse strategy when n=6, and n'=3.

FIG. 3 is a pulse pattern example of when n=6 and n'=2. FIG. 4 is a pulse pattern example of when n=6 and n'=3.

(2) another pattern is constituted of a front pulse portion, a multiple pulse portion and an end pulse portion as in (1). The patterns are different depending on whether n is an odd number or an even number. When n is an even number, the front pulse portion (heating pulse portion) has a time length of x'T and a power level of Pw. The multiple pulse portion contains {(n/2)−1} high level pulse portions and low level pulse portions (cooling pulse portion) therebetween. The high level pulse portion has a time length of y'T and a power level of Pw'. The low level pulse portion has a time length of (2−y')T and a power level of Pb. The end pulse portion has a time length of z'T and a power level of Pb'. When n is an odd number, the multiple pulse portion contains [{(n−1)/2}−1] high level pulse portions and low level pulse portions (cooling pulse portion) therebetween. The high level pulse portion has a time length of y'T and a power level of Pw'. The low level pulse portion has a time length of (2−y')T and a power level of Pb. The relationship among the power levels are: Pw≧Pe≧Pb and Pw'≧Pe≧Pb'.

Figure 5:
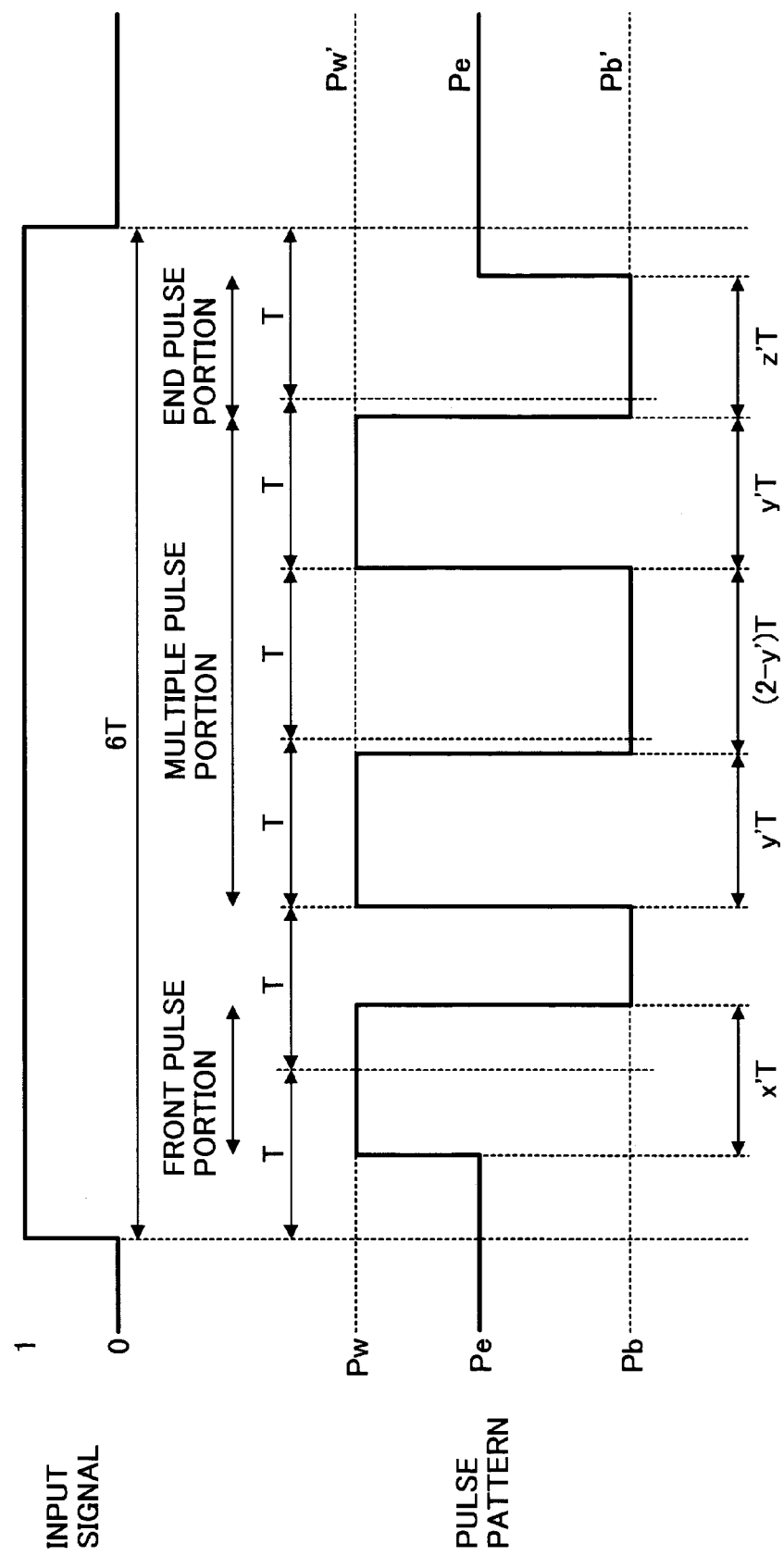
FIG. 5 is a wave form chart illustrating an example of the recording pulse strategy when n=6.
Figure 6:
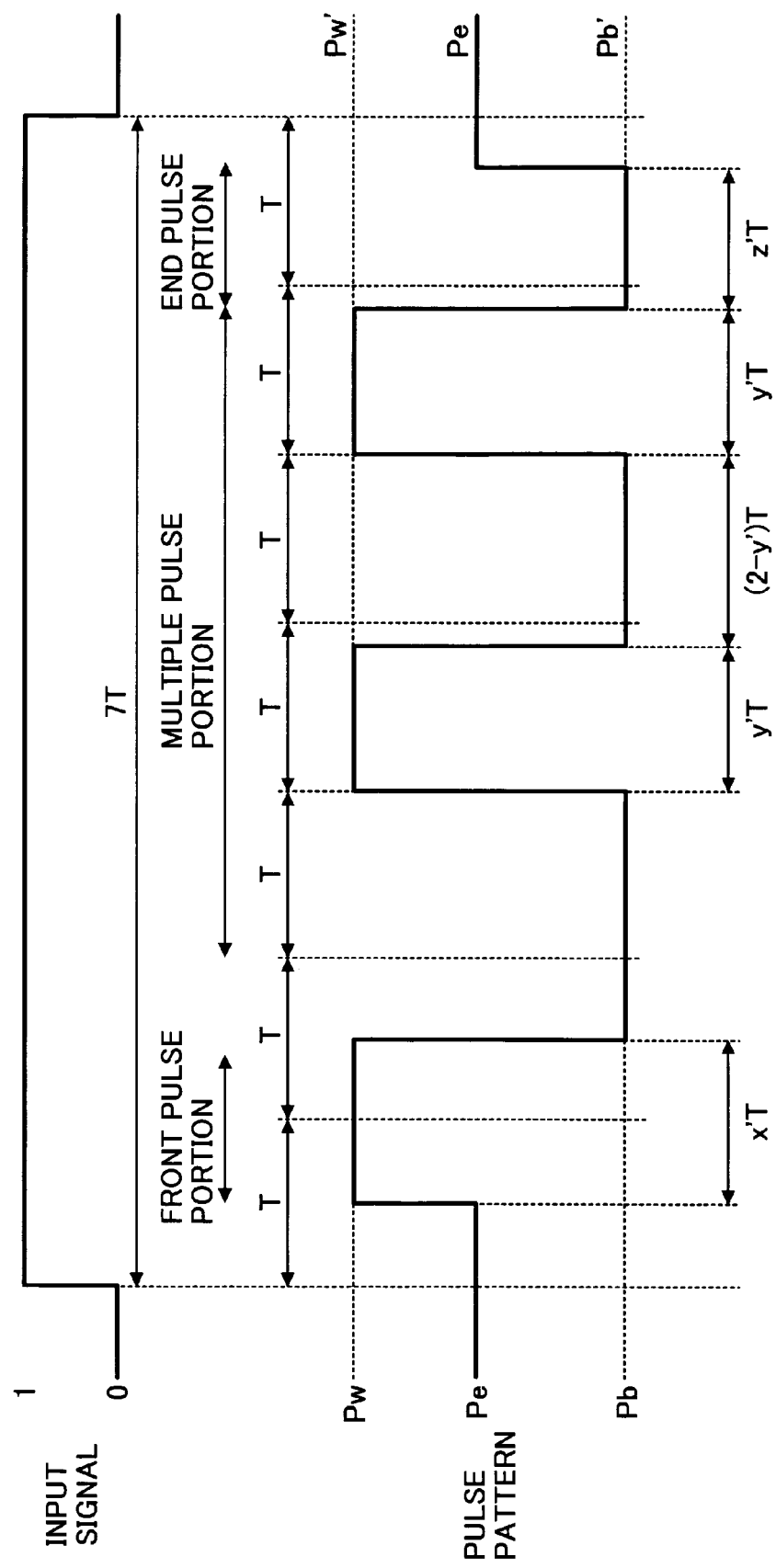
FIG. 6 is a wave form chart illustrating an example of the recording pulse strategy when n=7.

FIG. 5 is a pulse pattern example of when n=6 (i.e., an even number) and FIG. 6 is a pulse pattern example of when n=7 (i.e., an odd number).

(3) as yet another example, in the pattern illustrated in FIGS. 5 and 6, when n is an odd number, the multiple pulse portion has [{(n−1)/2}−1] high level pulse portions and low level pulse portions (cooling pulse portion) therebetween. The high level pulse portion has a time length of y'T and a power level of Pw'. The low level pulse portion has a time length of {n/[(n−1)/2]}T and a power level of Pb.

Figure 7:
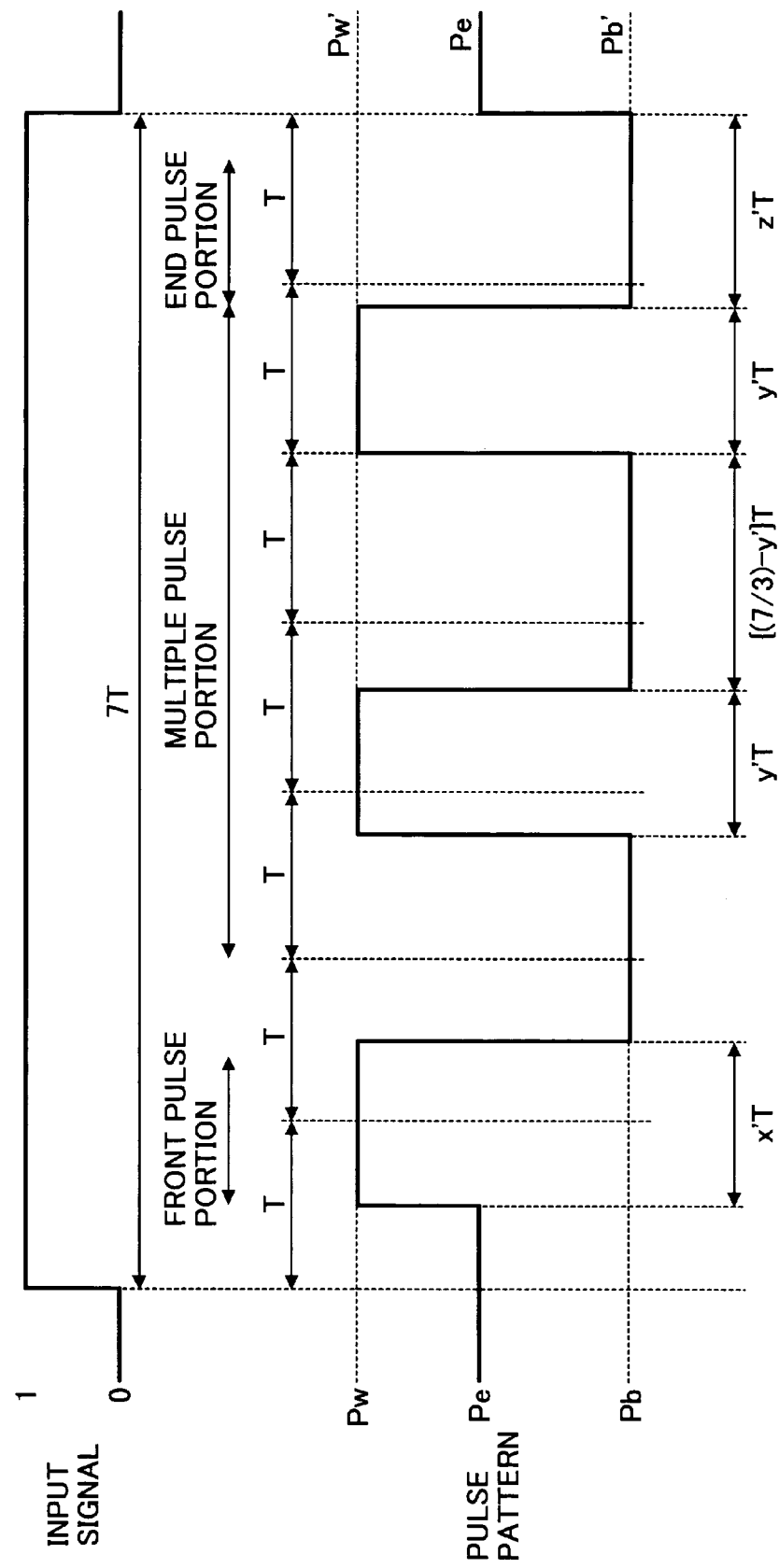
FIG. 7 is a wave form chart illustrating another example of the recording pulse strategy when n=7.

FIG. 7 is a pulse pattern example of when n=7.

Recordable linear velocity ranges, and optimum pulse width coefficients (i.e., coefficients of x, x', y, y', z and z' in the examples mentioned above) and optimum power levels (i.e., Pw, Pw', Pe, Pb and Pb' in the example mentioned above) for each recording linear velocity are different for the respective pulse patterns even when the same optical information recording medium 1 is used.

For example, when the cycles (i.e., total time of a time length of a high level pulse portion and a time length of a low level pulse portion of the multiple pulse portions in the patterns) are different as mentioned above for the same optical information recording medium 1, pulse patterns having a long cycle can generally have a long effective time length excluding the rise-up and fall-down time of a heating pulse. Therefore pulse patterns having a long cycle can record information at a high linear velocity and further can perform good recording with a low recording power at the same recording linear velocity.

To perform recording with good signal characteristics, it is necessary to select optimum parameter values for pulse width and power level for the pulse patterns mentioned above. Therefore, trial writing is typically performed prior to recording information to determine the optimum values.

Especially Optimum Power Control (OPC) methods are preferred to easily determine an optimum power level by trial writing. Japanese Patents Nos. 3081551 and 3124721, incorporated by reference, disclose specific examples of the OPC methods. When the methods disclosed in these patents are used, the following parameters are set: a specific value S, i.e., a gradient g(P) obtained when a recording power is Ps, where a gradient g(P) is obtained by standardizing a record signal amplitude (modulation level) m with a recording power of Pw; a coefficient R multiplied by Ps to calculate the optimum recording power; erase power level ratio ε(ε=Pe/Pw(Pw')); and a specific recording power Pwi referred to when a test recording is performed while varying a certain recording power within around −20 to 20%. The optimum recording power level Pwo can be obtained by OPC using these setup values.

Information Recording Method in an Embodiment of the Present Invention

In the background mentioned above, a targeted optical information recording medium 1 is irradiated with continuous light of a laser beam having a power level Pe prior to recording operation by the information recording method in an embodiment of the present invention. At this point, a step is performed for obtaining a transition linear velocity Vo defined as a minimum linear velocity which satisfies the following relationship: a reflection light intensity ratio Rr of the optical information recording medium is less than 1, wherein Rr is a ratio of a reflection light intensity Ra measured after the irradiation of the continuous light of the laser beam having the erase power level Pe on the optical information recording medium to a reflection light intensity Rb measured therebefore.

Figure 8:
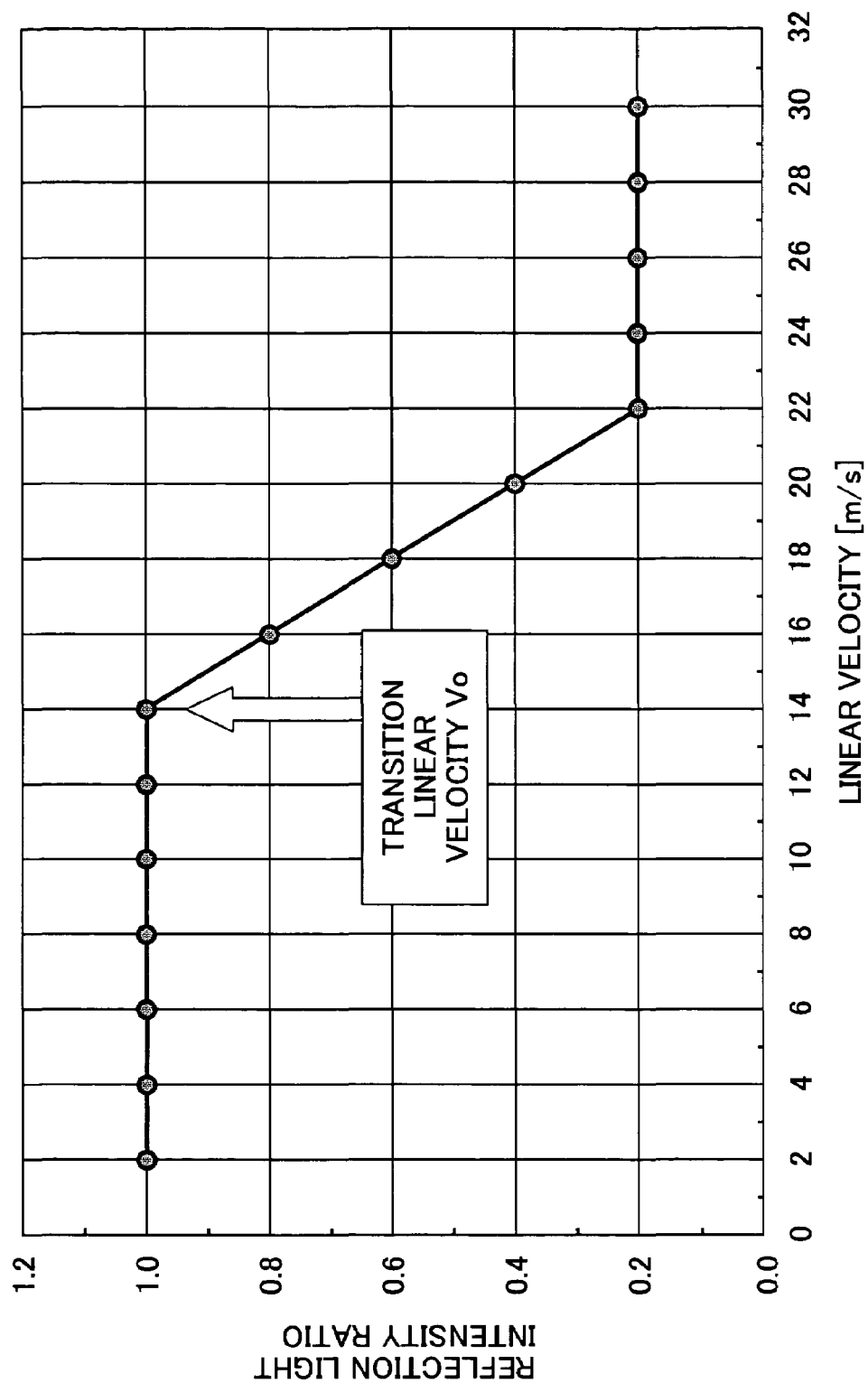
FIG. 8 is a characteristic chart illustrating dependency of the reflection light ratio of the optical information recording medium before and after irradiation of a laser beam on linear velocity.

"The transition linear velocity" is now described. Details of the transition linear velocity Vo are also described in JOP Nos. 11-115313 and 2002-358691. A phase change optical information recording medium 1 is rotated at various linear velocities with the information recording devices shown in FIG. 1 while the semiconductor laser beam tracks the guide groove of the optical information recording medium 1. Then the reflection light intensity (or reflectivity) Ra measured after the optical information recording medium 1 is irradiated with the continuous laser beam having an erase power level Pe is compared with the reflection light intensity (or reflectivity) Rb measured before the irradiation of the continuous light beam. In the measuring results of the ratio of reflection light intensity (or reflectivity) Rr (Ra/Rb) (refer to FIG. 8), the transition linear velocity Vo is the linear velocity at the point where the reflection light intensity (or reflectivity) Ra starts to descend as the linear velocity increases, i.e., the minimum point (i.e., the linear velocity indicated by the arrow in FIG. 8) which satisfies the relationship Rr (Ra/Rb)<1.

When the phase change optical information recording medium 1 is irradiated with continuous light of the laser beam, heat is applied to the phase change optical information recording medium 1 and the phase change recording layer 23 therein is heated to a temperature not lower than the melting point thereof and thus melted. When the phase change recording layer 23 is gradually cooled down, a crystalline phase is formed again. When the phase change layer 23 is rapidly cooled down and a crystalline phase is not formed, an amorphous (non-crystalline) state is achieved. This phenomenal difference is caused by the amount of added heat (i.e., the power level of a laser beam×time of irradiation) and the speed of cooling down (i.e., scanning linear velocity).

For example, continuous light of the laser beam having an erase power level Pe is irradiated on a phase change optical information recording medium 1 which is rotating at various linear velocities while the semiconductor laser tracks the guide groove of the phase change optical information recording medium 1. When this erase power level Pe is fixed and the scanning linear velocity of the continuous light of the laser beam increases, the heat amount per unit area gradually decreases and the speed away from the heated area increases. Therefore, the speed of cooling down of the recording layer 23 becomes gradually high and when this speed surpasses a certain linear velocity, it is impossible to crystallize the whole area of the recording layer 23 completely and thus a mixture state of crystalline state and amorphous state is achieved.

When a typical phase change optical information recording medium such as CD-RWs, DVD-RWs, DVD+RWs and DVD-RAMs made of a recording layer material which has a high reflectivity when the phase change recording layer 23 is in a crystalline state relative to that when the phase change recording layer 23 is in an amorphous state is used as an optical information recording medium 1 and a crystalline state is achieved again after the recording layer 23 is melted, the ratio of reflection intensity (or reflectivity) Rr is not less than 1. When a crystalline state is not achieved completely again after the recording layer 23 is melted and thus a crystalline and amorphous mixed state or simply an amorphous state is achieved, the ratio of reflection intensity (or reflectivity) Rr is less than 1.

Therefore, the transition linear velocity Vo defined here, i.e., the linear velocity at which Rr≧1 is changed to Rr<1, indicates the boundary of capability of crystallizing the whole area of the recording layer 23 after heat is applied thereto by irradiation of a laser beam. Thus the transition linear velocity Vo indicates the limit condition at which erasing (overwriting) can be performed for phase change optical information recording media 1. When the transition linear velocity Vo for a phase change optical information recording medium is high, recrystallization thereof is easy and erasing can be performed at a high linear velocity. Thus, it can be said that such a phase change optical information recording medium is suitable for recording at a high linear velocity. To the contrary, when the transition linear velocity Vo for a phase change optical information recording medium 1 is low, recrystallization thereof is difficult and thus such a phase change optical information recording medium is suitable for recording at a low linear velocity. Consequently, the transition linear velocity Vo is a parameter for determining the suitable recording velocity for a phase change optical information recording medium 1.

This point at which the ratio Rr is changed from not less than 1 to less than 1 depends on the amount of heat applied to the recording layer 23 and the speed of cooling down thereof. Thus, this point varies depending on material characteristics of the recording layer 23 of a phase change optical information recording medium 1, the structure of each layer thereof and the erase power level Pe of a laser beam irradiated.

For example, when a recording layer is made of a material easy to be crystallized, the transition linear velocity Vo is high. In contrast, when a recording layer is made of a material hard to be crystallized, the transition linear velocity Vo is low. When the recording layer 23 and the upper protective layer 24 are thick, the optical information recording medium 1 has a large thermal capacity. Therefore, when the erase power level Pe is fixed, irradiation time of the laser beam should belong and thus the transition linear velocity Vo is low. To the contrary, when the recording layer 23 and the upper protective layer 24 are thin, the transition linear velocity Vo is high.

When the erase power level Pe of a laser beam for use in measuring the transition linear velocity Vo is high, the heat amount applied to the phase change recording layer 23 increases and thus a melted area of the recording layer 23 is wide. Further, the temperature of the recording layer 23 rises high and the recording layer 23 is rapidly cooled down. As a result, when the erase power level Pe is high, the transition linear velocity is low for the same phase change optical information recording medium 1.

When the erase power level Pe is too high, the transition linear velocity Vo is thus sought in a low linear velocity range. Thereby, the ratio of measuring error is large and resultingly it is hard to find out the difference among optical information recording media 1. In contrast, when the erase power level Pe is too low, the transition linear velocity Vo is high and thus the rotation speed at measurement is high, resulting in deterioration of measurement accuracy. Further, the measuring area is so large that the information recording device may reach the upper limit of its rotation speed before reaching the transition linear velocity Vo. Consequently, it is preferred that the erase power level Pe for use in measuring the transition linear velocity Vo satisfies the following relationship: $(Pwo/2) \leq Pe \leq (Pwo/2) \times 1.5$ and more preferably, $(Pwo/2) \leq Pe \leq (Pwo/2) \times 1.3$.

The transition linear velocity Vo cannot be determined in some cases because the reflection light intensity (or reflectivity) does not decrease and thus the reflection light intensity (or reflectivity) ratio Rr is always not less than 1. This occurs, for example, (1) when the heat amount applied to the recording layer 23 is too small to raise the temperature thereof to its melting point and thus the recording layer 23 is not melted, i.e., the crystalline state is not changed and (2) when the recording layer 23 is melted but the material for use in the recording layer 23 is crystallized so easily that recrystallization always occurs in the measuring range.

The transition linear velocity Vo is obtained by measuring the reflection light intensity (or reflectivity) before and after continuous light having an erase power level Pe is irradiated as mentioned above. For the information recording device as illustrated in FIG. 1, the transition linear velocity Vo can be easily measured. It is preferred that, when the information recording device as illustrated in FIG. 1 is used for each unknown optical information recording medium 1 having no recording settings in disc information, etc., a test measuring for obtaining the transition linear velocity Vo (transition linear velocity measuring means) be performed for each unknown optical information recording medium 1 prior to determination of recording conditions therefor. When the result of the test measurements for an unknown optical information recording medium 1 is always that the reflection light intensity ratio (or reflectivity ratio) Rr is not less than 1 and thus the transition linear velocity Vo is not obtained, it is highly probable that the optical information recording medium 1 is impossible to record information therein with the information recording device and therefore it is preferred not to perform recording in the medium therewith.

As a method of changing linear velocities at measuring the reflection light intensity ratio Rr, there are methods using Constant Linear Velocity (CLV) system and Constant Angular Velocity (CAV) system. In CLV system, measuring is performed at a fixed radius point in an optical information recording medium while the rotation speed thereof increases. In CAV system, measuring is performed while radius points measured in an optical information recording medium in rotation are changed.

When CLV system is used, the peripheral portion of an optical information recording medium 1 is preferably used relative to the inner portion thereof. This is because the rotation speed of the optical information recording medium 1 at a peripheral portion is slow relative to that at an inner portion and thus the measuring is stable at the peripheral portion. It is more preferred to use the peripheral portion outside the data area of the optical information recording medium 1 because the capacity of the optical information recording medium is not affected.

In CAV system, the rotation speed of an optical information recording medium 1 is constant. Therefore, controlling the rotation motor (the spindle motor 2) of the measuring device (i.e., information recording device) is easy and measuring can be performed in a short time.

When an optical information recording medium 1 is loaded in an information recording device and the optical information recording medium contains encoded information relating to the test range of linear velocity for use in obtaining the transition linear velocity Vo, such as test ranges of linear velocity or parameters functioning as indices thereof, and/or encoded information relating to the range of the erase power level Pe of a laser beam for use in obtaining the transition linear velocity Vo, such as the range of the erase power level Pe and parameters functioning as indices thereof, encoded in the optical information recording medium 1 as preformatted information, the information recording device can read the values in the encoded preformatted information and the read values can be used for determining the test range for linear velocities and the erase power level Pe used in advance. In a combination of such an optical information recording medium 1 and an information recording device, the transition linear velocity Vo can be obtained in a speedy and precise manner.

Any preformatting methods such as prepit methods, wobble encoding methods, formatting methods can be used. The prepit method is a preformatting method by which information on recording conditions is preformatted in an area using Read Only Memory (ROM) pits. These ROM pits are formed at the time of forming a substrate and thus the prepit methods are excellent in mass productivity. In addition, ROM pits have advantages in terms of playback reliability and amount of information. However, the prepit method has various kinds of unsolved problems with regard to forming ROM pits (i.e., hybrid technology). Formatting technology using prepits is considered to be difficult especially for rewritable phase change optical information recording media.

In the formatting methods, information is recorded by the same manner as used in conventional recording by an information recording device. However, in this method, formatting is necessary for each optical information recording medium 1 after the optical information recording medium 1 is manufactured, meaning that the method has a difficulty in terms of mass productivity. Further, considering that overwriting the preformatted information is difficult, this method is unsuitable for recording information unique to an optical information recording medium 1.

The wobble encoding methods are actually adopted for CD-RWs and DVD-RWs. This method uses the technology for encoding the address information of an optical information recording medium 1 in wobbling of the groove (the guiding groove in the optical information recording medium 1). As encoding methods, Absolute Time In Pregroove (ATIP) based on frequency modulation is used for CD-RWs or Address in Pregroove (ADIP) based on phase modulation is used for DVD-RWs. In the wobble encoding methods, preformatted information such as parameters is recorded on the substrate of an optical information recording medium 1 together with the address information at the time of forming the substrate. Therefore, this method is excellent in productivity. Further, forming particular ROM pits used by the prepit methods is not necessary and thus the substrate is easily manufactured. These parameters are preformatted for CD-RWs and DVD-RWs as ATIP Extra Information and Physical Information, respectively.

When recording information in the phase change recording layer 23 is performed at a linear velocity higher than the transition linear velocity Vo and the phase change recording layer 23 is heated to a temperature not lower than its melting point at the time of erasing, the phase change recording layer 23 does not achieve a crystalline state again but an amorphous state. Therefore, to record information with good signal characteristics in a phase change optical information recording medium 1 within a linear velocity range above the transition linear velocity Vo by using the pulse patterns mentioned above, the recording layer 23 is necessary to be heated to a temperature range of from not lower than its crystallization temperature to lower than its melting point and then cooled down to achieve a crystalline state. Thus, the erase power level Pe is necessary to be controlled within a low power level range.

For a linear velocity range lower than the transition linear velocity Vo, as in the case of a linear velocity range above the transition linear velocity Vo, a crystalline state can be also achieved again by cooling down the recording layer 23 after the recording layer 23 is heated to a temperature range of from not lower than its crystallization temperature to lower than its melting point. However, to perform recording with good signal characteristics, it is preferred to heat the phase change recording layer 23 to a temperature higher than its melting point at the time of erasing followed by cooling down the recording layer 23 to achieve a crystalline state again because crystalline lattice, etc. in the crystalline state is aligned. In this case, the erase power level Pe required is high relative to that required in the linear velocity range higher than the transition linear velocity Vo.

As described in JOP No. 2003-322740, there are phase change optical information recording media 1 having at least two erase power levels Pe at which the jitter characteristics of recording marks have minimal peaks. The difference between crystallization processes mentioned above accounts for this. For example, pulse widths and power levels Pw (Pw') and Pb (Pb') are fixed and just the erase power level Pe is changed at a linear velocity not higher than the transition linear velocity Vo with the pulse patterns mentioned above. When the erase power level Pe is low, formation of a 0 signal (crystalline state) is performed by heating the phase change recording layer 23 to a temperature range of from not lower than its crystallization point to lower than its melting point, (i.e., the applied heat amount is small), and cooling thereafter. In contrast, when the erase power level Pe is high, crystallization is performed by heating the phase change recording layer 23 to a temperature not lower than its melting point and thus melted prior to cooling. Thus, the optimum power level Pe exists for each crystallization process and therefore there are two erase power levels Pe at which the jitter characteristic value has a minimal peak. Generally, the jitter characteristic values obtained after the phase change recording layer 23 is once melted before cooling (i.e., the erase power is high) are the minimum. In addition, the erase power level Pe ranging between the two minimal peaks is not the optimum value for both crystallization processes and therefore the jitter characteristic values therefor deteriorate.

However, for recording at a linear speed higher than the transition linear velocity Vo, once the phase change recording layer 23 is heated to a temperature higher than its melting point before cooling, the phase change recording layer 23 cannot achieve a crystalline state again. Therefore, the crystallization method by which the recording layer 23 is heated to a temperature range of from not lower than its crystallization point to its melting point followed by cooling is adopted.

Thus, an optimum erase power level ratio $\epsilon$ of the erase power level Pe to the recording power level Pw for performing recording with good signal characteristics changes on reaching the transition linear velocity Vo. When the optimum erase power level ratio $\epsilon L$ for a range of linear velocities lower than the transition linear velocity Vo is compared with the optimum erase power level ratio $\epsilon H$ for a range of linear velocities higher than the transition linear velocity Vo, $\epsilon L$ is higher than $\epsilon H$ (i.e., $\epsilon H/\epsilon L<1$).

When recording is performed by simple CAV or zone CAV system, it is easy to set a recording condition with a fixed erase power level ratio $\epsilon$ relative to with an erase power level ratio $\epsilon$ changing in the middle. Therefore, it is preferred to select a range of linear velocity lower than the transition linear velocity Vo obtained beforehand or a range of linear velocity higher than the transition linear velocity Vo. Also, when recording is performed in a linear velocity range lower than the transition linear velocity Vo, it is preferred to use the recording conditions based on $\epsilon L$ (i.e., the erase power level $\epsilon$ is relatively high). In contrast, when recording is performed at a linear velocity higher than the transition linear velocity Vo, it is preferred to use the recording conditions based on $\epsilon H$ (i.e., the erase power level $\epsilon$ is relatively low).

When the reliability of recording with good signal characteristics is important including the case of a recording by CLV system, it is preferred to record at a linear velocity lower than the transition linear velocity Vo since recording can be performed with a relatively high erase power level ratio $\epsilon$. To the contrary, recording in a linear velocity range above the transition linear velocity Vo is performed when a high speed recording has a priority.

When the range of a recording linear velocity required for CAV or ZCAV is wide and includes the transition linear velocity Vo, the erase power level ratio $\epsilon H$ set for a linear velocity range above the transition linear velocity Vo is selected for recording conditions to avoid switching the erase power level ratio $\epsilon$ in the middle of recording.

When recordings with good signal characteristics are prioritized in a linear velocity range lower than the transition linear velocity Vo, the erase power level ratios $\epsilon L$ is selected. The erase power ratio $\epsilon H$ is selected for a linear velocity range above the transition linear velocity Vo. In the range of linear velocities higher than the transition linear velocities Vo, it is impossible to record information when the phase change recording layer 23 is heated to a temperature higher than its melting point at the time of erasing. Therefore, the linear velocity at which the erase power level ratio is changed from $\epsilon L$ to $\epsilon H$ is preferably a linear velocity lower than the transition linear velocity Vo.

Changing the erase power level ratio from $\epsilon L$ to $\epsilon H$ linearly to the recording linear velocity is not preferred since the jitter characteristics of recording marks may deteriorate at an erase power ratio $\epsilon$ in the middle of linear changing.

Therefore, when the transition linear velocity Vo for a phase change optical information recording medium 1 can be obtained, information can be obtained with regard to a recordable range of linear velocities and a suitable erase power level ratio $\epsilon$. When the linear velocity for recording is determined, the optimum recording power level can be obtained by OPC method.

Thus, even when an optical information recording medium 1 is loaded in an information recording device having no recording conditions therefor, recording can be performed by the information recording device with a suitable linear velocity, recording power level Pw and erase power level Pe as long as the transition linear velocity Vo of the optical information recording medium 1 is obtained.

FIG. 9 is a schematic flowchart of an information recording program processed by the CPU 13 illustrating the information recording method mentioned above. Steps in the program are as follows: whether an optical information recording medium 1 is loaded is checked and when the optical information recording medium 1 is loaded (Yes to Step 1), a process to recognize the kind of the optical information recording medium 1 (Step 2) is performed; when the optical information recording medium 1 is recognized (Yes to Step 2), whether the information recording device has recording conditions for the optical information recording medium 1 is checked (Step 3); when there is such a recording condition (Yes to Step 3), a recording operation according to the recording condition is performed (branched to normal recording steps); when the optical information recording medium 1 is not recognized (No to Step 2) or when the optical information recording medium 1 is recognized but there is no recording condition therefor (No to Step 3), the transition linear velocity Vo is measured (Step 4), meaning that the reflection light intensities Ra and Rb are measured while the linear velocity is changed and the transition linear velocity Vo at which the reflection light intensity ratio Rr (Ra/Rb) is less than 1 is obtained (the process of Step 4 is performed as a means to obtain the transition linear velocity Vo and a process to measure the transition linear velocity Vo);

after the transition linear velocity Vo is obtained, specification of recording operation is determined (Step 5), that is, since the range of recordable linear velocities and suitable erase power ratio $\epsilon$ can be determined when the transition linear velocity Vo is obtained, recording operation conditions such that recording operation is performed within the range of linear velocities not higher than the transition linear velocity Vo are specified; the recording linear velocity is determined according to this specification, trial writings by OPC method are performed and then the optimum recording power level Pwo is determined (Step 6); and an actual recording operation is performed (Step 7). These processes from Steps 5 to 7 are performed functioning as a means to control recording operations.

EXAMPLES

Examples of embodiments of the present invention are described below. These examples have illustration purposes only and do not limit the scope of the present invention.

Example 1

Preformatted information was encoded on a guide groove on an injection molded polycarbonate substrate having a diameter of 120 mm and a thickness of 0.6 mm by the phase modulation wobble encoding method. The encoded preformatted information was that the test range of linear velocities for use in obtaining a transition linear velocity Vo was from 5.0 to 12.0 m/s, the range of the power level Pe used was from 7.5 to 8.0 mW and the erase power level ratio $\epsilon L$ was 0.50 for the range of linear velocities not higher than the transition linear velocity Vo. A lower protective layer, a recording layer, an upper protective layer and a reflective layer were formed on the substrate accordingly by a sputtering method.

Both protective layers were made of $(ZnS)_{80}(SiO_2)_{20}$. The recording layer was made of a phase change material of $Ag_2Ge_2In_4Sb_{70}Te_{22}$. The reflective layer was made of Ag. The layer thicknesses were 80 nm, 20 nm, 15 nm and 140 nm from the side of the substrate.

A single plate disc of a phase change optical information recording medium having DVD-ROM playback compatibility was obtained by forming an overcoating layer made of an ultraviolet curing resin on the reflective layer by a spin coating method.

Next, another polycarbonate substrate was attached to the overcoating layer with an adhesive layer therebetween. A printing layer was formed on the surface of the attached polycarbonate substrate (surface opposite to the attached side thereof). Thus, an attached disc was obtained.

Thereafter, the recording layer of the phase change optical information recording medium was completely crystallized with an initializing device containing a laser diode having a large diameter (beam spot diameter: 200 µm×1 µm).

For the thus prepared optical information recording medium having DVD-ROM compatibility, the reflection light intensity before and after irradiation of continuous light of a laser beam having an erase power level Pe of 8.0 mW was measured at a peripheral portion of the medium by an information recording device (a test drive manufactured by Ricoh Co. Ltd.) having DVD compatibility performing a CLV recording at 0.95×the transition linear velocity Vo. The transition linear velocity Vo thus obtained was 8.9 m/s.

For the optical information recording medium, the optimum recording power level Pwo at a linear velocity of 8.9 m/s×0.95, i.e., 8.5 m/s, was obtained by the OPC method using the information recording device described above and the Pwo obtained was 14.2 mW. Thereafter, DVD content data were recorded in the entire disc by the CLV system at a linear velocity of 8.5 m/s under conditions of a Pw of 14.2 mW and an $\epsilon$ of 0.50.

For the recorded portion, jitter (data to clock jitter) characteristics at points located at a radius of 24 mm, 41 mm and 58 mm were measured using a playback evaluation device for DVDs (DDU-1000 manufactured by Pulstec Industrial Co., Ltd.) and the results were 7.0%, 6.6% and 6.8%, respectively. These values indicated that the characteristics were excellent and sufficiently met the required specification values (i.e., not greater than 8.0%) for the DVD-ROM specifications.

In addition, the content data recorded in the optical information recording medium was successfully read by a DVD-ROM playback device (MP 9120A manufactured by Ricoh Co., Ltd.) without a reading error.

Example 2

For an optical information recording medium having DVD-ROM compatibility manufactured in the same manner as in Example 1, the reflection light intensity before and after irradiation of a laser beam having an erase power level Pe was measured by a DVD compatible information recording device (a test drive manufactured by Ricoh Co. Ltd.) performing a CAV recording in the entire disc (i.e., the portion in the range of from a radius of 24 to 58 mm thereof) to obtain the transition linear velocity Vo. The maximum recording linear velocity of this device is 0.95×the transition linear velocity Vo. Measuring was performed at a linear velocity within a range of from 5.0 to 12.0 m/s with continuous light having an erase power level Pe of 8.0 mW and a fixed disc rotation number of 2000 rpm while the measuring points were changed from the inner portion to the peripheral portion. The transition linear velocity Vo thus obtained was 8.9 m/s.

For the optical information recording medium, the optimum recording power level Pwo at a linear velocity of 0.95×8.9 m/s, i.e., 8.5 m/s, was obtained by the OPC method using the information recording device described above and the Pwo thus obtained was 14.4 mW. In addition, the optimum recording power level Pwo at a linear velocity of 8.5/(58/24) m/s, i.e., 3.5 m/s was 14.8 mW. DVD content data were recorded in a linear velocity range of from 3.5 to 8.5 m/s in the entire disc by the ZCAV system. At this point, Pw was linearly reduced from 14.8 mW for the inner portion in which a linear velocity was 3.5 m/s to 14.4 mW for the peripheral portion in which a linear velocity was 8.5 m/s. The optimum recording power level Pwo is linearly reduced and for example, in the middle portion (a linear velocity of 6.0 m/s), Pw used was 14.6 mW. The erase power level ratio was fixed at 0.50.

For the recorded portion, jitter (data to clock jitter) characteristics at points located at a radius of 24 mm, 41 mm and 58 mm were measured using a playback evaluation device for DVDs (DDU-1000 manufactured by Pulstec Industrial Co., Ltd.) and the results were 6.2%, 6.2% and 6.9%, respectively. These values indicated that the characteristics were excellent and sufficiently met the required specification values (i.e., not greater than 8.0%) for the DVD-ROM specifications.

In addition, the content data recorded in the optical information recording medium was successfully read by a DVD-ROM playback device (MP 9120A manufactured by Ricoh Co., Ltd.) without a reading error.

Example 3

The preformatted information was encoded on a guide groove of an injection molded polycarbonate substrate having a diameter of 120 mm and a thickness of 0.6 mm by the phase modulation wobble encoding method. The encoded preformatted information was that the test range of linear velocities for use in obtaining a transition linear velocity Vo was from 7.5 to 18.0 m/s, the range of the power level Pe used was from 10.0 to 12.0 mW, the erase power level ratio $\epsilon L$ for a linear velocity range not above the transition linear velocity Vo was 0.48 and the erase power level ratio $\epsilon H$ for a linear velocity range above the transition linear velocity Vo was 0.30. A lower protective layer, a recording layer, an upper protective layer and a reflective layer were formed on the substrate accordingly by a sputtering method.

Both protective layers were made of $(ZnS)_{80}(SiO_2)_{20}$. The recording layer was made of a phase change material of $Ag_2Ge_2In_4Sb_{72}Te_{20}$. The reflective layer was made of Ag. The layer thicknesses were 70 nm, 15 nm, 15 nm and 120 nm from the side of the substrate.

A single plate disc of phase change optical information recording medium having DVD-ROM playback compatibility was obtained by forming an overcoating layer made of an ultraviolet curing resin on the reflective layer by a spin coating method.

Next, another polycarbonate substrate was attached to the overcoating layer with an adhesive layer therebetween. A printing layer was formed on the surface of the attached polycarbonate substrate (surface opposite to the attached side thereof). Thus, an attached disc was obtained.

Thereafter, the recording layer of the phase change optical information recording medium was completely crystallized with an initializing device having a laser diode having a large diameter (beam spot diameter: 75 μm×1 μm).

For the thus obtained optical information recording medium having DVD-ROM compatibility, the reflection light intensity before and after irradiation of a laser beam was measured by an information recording device (a test drive manufactured by Ricoh Co. Ltd.) performing a CAV recording at linear velocities of 14.0 m/s (equivalent to 4×DVD-ROM playback linear velocity) at maximum to obtain the transition linear velocity Vo. Measuring was performed in a linear velocity range of from 7.5 to 18.0 m/s with continuous light having an erase power level Pe of 11.0 mW and a fixed disc rotation number of 3,000 rpm while the measuring points were changed from inner to peripheral. The transition linear velocity Vo thus obtained was 11.0 m/s.

For the optical information recording medium, the optimum recording power level Pwo at a linear velocity of 14.0 m/s was obtained by the OPC method using the information recording device described above and the Pwo obtained was 20.0 mW. In addition, the optimum recording power level Pwo at the minimum linear velocity of 5.8 m/s in this case was 17.8 mW. Further the optimum recording power level Pwo at a linear velocity of 9.9 m/s in the middle range was 17.8 mW. Thereafter, DVD content data were recorded in the entire disc as follows: for the area occupying an area between a radius of 24 mm (linear velocity of 5.8 m/s) and 43.5 mm (linear velocity of 10.7 m/s), ZCAV was used at a rotation speed of 2,300 rpm obtained at a radius of 58 mm and a linear velocity of 14.0 m/s while Pw was 17.8 mW and ε was 0.48; and for the area occupying an area between a radius of 43.5 mm (linear velocity of 10.7 m/s) and 58 mm (linear velocity of 14.0 m/s), ZCAV was used while Pw was 20.0 mW and ε was 0.30.

For the recorded portion, jitter (data to clock jitter) characteristics at points located at a radius of 24 mm, 41 mm and 58 mm were measured using a playback evaluation device for DVDs (DDU-1000 manufactured by Pulstec Industrial Co., Ltd.) and the results were 6.9%, 6.6% and 7.5%, respectively. These values indicate that the characteristics were excellent and sufficiently met the required specification values (i.e., not greater than 8.0%) for the DVD-ROM specifications.

In addition, the content data recorded in the optical information recording medium was successfully read by a DVD-ROM playback device (MP 9120A manufactured by Ricoh Co., Ltd.) without a reading error.

Example 4

The preformatted information was encoded on a guide groove of an injection molded polycarbonate substrate having a diameter of 120 mm and a thickness of 1.2 mm by the frequency modulation wobble encoding method. The encoded preformatted information was that the range of power level Pe for use in obtaining a transition linear velocity Vo was from 18.0 to 20.0 mW, the erase power level ratio εL for a linear velocity range not above the transition linear velocity Vo was 0.45 and the erase power level ratio εH for a linear velocity range above the transition linear velocity Vo was 0.35. A lower protective layer, a recording layer, an upper protective layer and a reflective layer were formed on the substrate accordingly by a sputtering method.

Both protective layers were made of $(ZnS)_{80}(SiO_2)_{20}$. The recording layer was made of a phase change material of $Ge_4Ga_2Sb_{72}Te_{22}$. The reflective layer was made of $Al_{98}Ti_2$. The layer thicknesses were 85 nm, 20 nm, 20 nm and 140 nm from the side of the substrate.

A phase change optical information recording medium having CD-ROM playback compatibility was obtained by forming an overcoating layer made of an ultraviolet curing resin on the reflective layer by a spin coating method.

Thereafter, the recording layer of the phase change optical information recording medium was completely crystallized with an initializing device having a laser diode having a large diameter (beam spot diameter: 100 μm×1 μm).

For the thus prepared optical information recording medium having CD-ROM compatibility, the reflection light intensity before and after irradiation of continuous light of a laser beam having an erase power level Pe of 18.0 mW was measured at a peripheral portion of the medium by an information recording device (a test drive manufactured by Ricoh Co. Ltd.) having CD compatibility performing a CLV recording at a linear velocity of 19.2 m/s (equivalent to 16×CD-ROM playbacklinear velocity) The transition linear velocity Vo thus obtained was 14.5 m/s.

For the optical information recording medium, the optimum recording power level Pwo at a linear velocity of 19.2 m/s was obtained by the OPC method using the information recording device described above and the Pwo obtained was 28.0 mW. Thereafter, CD content data were recorded in the entire disc by the CLV system at a linear velocity of 19.2 m/s under conditions of a Pw of 28.0 mW and an ε of 0.35.

For the recorded portion, 3T jitter characteristics at points having a radius of 24 mm, 41 mm and 58 mm were measured using a playback evaluation device for CDs (DDU-1000 manufactured by Pulstec Industrial Co., Ltd.) and the results were 28 ns, 25 ns and 30 ns, respectively. These values indicate that the characteristics were excellent and sufficiently met the required specification values (i.e., not greater than 35 ns) for the CD-ROM specifications.

In addition, the content data recorded in the optical information recording medium was successfully read by a CD-ROM playback device (MP 9120A manufactured by Ricoh Co., Ltd.) without a reading error.

Example 5

The preformatted information was encoded on a guide groove of an injection molded polycarbonate substrate having a diameter of 120 mm and a thickness of 1.2 mm by the frequency modulation wobble encoding method. The encoded preformatted information was that the range of power level Pe for use in obtaining a transition linear velocity Vo was from 18.0 to 20.0 mW, and the erase power level ratio εH for a linear velocity range above the transition linear velocity Vo was 0.32. A lower protective layer, a recording layer, an upper protective layer and a reflective layer were formed on the substrate accordingly by a sputtering method.

Both protective layers were made of $(ZnS)_{80}(SiO_2)_{20}$. The recording layer was made of a phase change material of $Ge_3Ga_7Sb_{72}Te_{18}$. The reflective layer was made of Ag. The layer thicknesses were 80 nm, 15 nm, 15 nm and 120 nm from the side of the substrate.

A phase change optical information recording medium having CD-ROM playback compatibility was obtained by forming an overcoating layer made of an ultraviolet curing resin on the reflective layer by a spin coating method.

Thereafter, the recording layer of the phase change optical information recording medium was completely crystallized with an initializing device having a laser diode having a large diameter (beam spot diameter: 100 µm×1 µm).

For the thus prepared optical information recording medium having CD-ROM compatibility, the reflection light intensity before and after irradiation of continuous light of a laser beam having an erase power level Pe of 20.0 mW was measured at a peripheral portion of the medium by an information recording device (a test drive manufactured by Ricoh Co. Ltd.) having CD compatibility, a maximum linear recording velocity of 24.0 m/s (equivalent to 20×CD-ROM playback linear velocity) and a maximum rotation speed of 7,000 rpm. The transition linear velocity Vo thus obtained was 15.0 m/s.

For the optical information recording medium, the optimum recording power level Pwo at a linear velocity of 24.0 m/s was obtained by the OPC method using the information recording device described above and the Pwo obtained was 31.0 mW. The optimum recording power level Pwo also obtained for a point located at a radius of 24 mm at a rotation speed of 7,000 rpm, i.e., a linear velocity of 17.5 m/s, was 29.0 mW. Thereafter, CD content data were recorded in the entire medium as follows: ZCAV was used for the area occupying between a radius of 24 mm and 32.7 mm where the linear velocity reaches 24.0 m/s at a fixed rotation speed of 7,000 rpm; and CLV is used for the area occupying between a radius of 32.7 mm and 58 mm with the linear velocity being fixed at 24.0 m/s. For this recording, the recording power levels Pw used for the inner portion (linear velocity of 17.5 m/s) and for the outer portion (linear velocity of 24.0 m/s) were 29.0 mW and 31.0 mW, respectively, while the recording power level Pw increased linearly from 29.0 to 31.0 mW. The reflection light intensity ratio ϵ was fixed at 0.32.

For the recorded portion, 3T jitter characteristics at portions having a radius of 24 mm, 41 mm and 58 mm were measured using a playback evaluation device for CDs (DDU-1000 manufactured by Pulstec Industrial Co., Ltd.) and the results were 25 ns, 25 ns and 30 ns, respectively. These values indicate that the characteristics were excellent and sufficiently met the required specification values (i.e., not greater than 35 ns) for the CD-ROM specifications.

In addition, the content data recorded in the optical information recording medium was successfully read by a CD-ROM playback device (MP 9120A manufactured by Ricoh Co., Ltd.) without a reading error.

Example 6

For an optical information recording medium having DVD-ROM compatibility manufactured in the same manner as in Example 1, the reflection light intensity before and after irradiation of continuous light of a laser beam having an erase power level Pe of 11.0 mW was measured by a DVD compatible information recording device (a test drive manufactured by Ricoh Co. Ltd.) performing recording at a linear velocity of 8.5 m/s using the inner portion of the disc to obtain the transition linear velocity Vo. The thus obtained transition linear velocity Vo was 7.5 m/s.

For the optical information recording medium, the optimum recording power level Pwo at a linear velocity of 8.5 m/s was obtained by the OPC method using the information recording device described above and the Pwo thus obtained was 14.2 mW.

This recording was performed in a linear velocity range above the transition linear velocity. Thus DVD content data were recorded in the entire disc with an erasing power level ratio ϵ of 0.30 which was lower than that in Example 1 and a Pw of 14.2 mW by CLV system at a linear velocity of 8.5 m/s.

For the recorded portion, jitter (data to clock jitter) characteristics at points located at a radius of 24 mm, 41 mm and 58 mm were measured using a playback evaluation device for DVDs (DDU-1000 manufactured by Pulstec Industrial Co., Ltd.) and the results were 8.6%, 7.8% and 8.2%, respectively. These values indicated that the jitter characteristics in this Example deteriorate relative to those in Example 1. Jitters at the point located at a radius of 24 mm and 58 mm failed to satisfy the required specification values (i.e., not greater than 8.0%) for the DVD-ROM specifications. With regard to reading data, the content data recorded in the optical information recording medium was successfully read by a DVD-ROM playback device (MP 9120A manufactured by Ricoh Co., Ltd.) without a reading error.

Comparative Example 1

For an optical information recording medium having DVD-ROM compatibility manufactured in the same manner as in Example 3, the reflection light intensity before and after irradiation of continuous light of a laser beam having an erase power level Pe of 8.0 mW was measured by a DVD compatible information recording device (a test drive manufactured by Ricoh Co. Ltd.) performing recording at a linear velocity of 14.0 m/s using the peripheral portion of the disc to obtain the transition linear velocity Vo. In the range of from a linear velocity of 3.5 m/s to 22.0 m/s, the reflection light intensity ratio Rr, i.e., the ratio of the reflection light intensity before and after irradiation of continuous light of a laser beam having an erase power level Pe, was not below 1. Further, in the linear velocity range above 22.0 m/s, tracking serve did not work properly because the rotation of the disc was too fast. Thus the reflection light intensity ratio Rr was not measurable.

Therefore, under this measuring condition, the transition linear velocity was not obtainable.

The optimum recording power level Pwo at a linear velocity of 14.0 m/s obtained by OPC method was 20.0 mW.

Table 1 shows the results of Examples 1 to 6 and Comparative Example 1.

TABLE 1

| | Continuous light | | Optimum Power | | | | Recording signal characteristics | | | |
|---|---|---|---|---|---|---|---|---|---|---|
| | Power level Pe (mW) | Transition linear velocity Vo (m/s) | Recording linear velocity (m/s) | level ratio Pwo (mW) | Pe/ (Pwo/2) | Erase power level ratio ϵ | Jitter characteristics | | | ROM drive playback test |
| | | | | | | | Inner circle portion | Middle circle portion | Peripheral portion | |
| Example 1 | 8.0 | 8.9 | 8.5 | 14.2 | 1.13 | 0.50 | 7.0 (%) | 6.6 (%) | 6.8 (%) | Good |
| Example 2 | 8.0 | 8.9 | 3.5 | 14.8 | 1.08 | 0.50 | 6.2 (%) | 6.2 (%) | 6.9 (%) | Good |
| | | | 8.5 | 14.4 | 1.11 | 0.50 | | | | |
| Example 3 | 11.0 | 11.0 | 5.8 | 17.8 | 1.24 | 0.48 | 6.9 (%) | 6.6 (%) | 7.5 (%) | Good |
| | | | 9.9 | 17.8 | 1.24 | 0.48 | | | | |
| | | | 14.0 | 20.0 | 1.10 | 0.30 | | | | |
| Example 4 | 18.0 | 14.5 | 19.2 | 28.0 | 1.29 | 0.35 | 28 (ns) | 25 (ns) | 30 (ns) | Good |
| Example 5 | 20.0 | 15.0 | 17.5 | 29.0 | 1.38 | 0.32 | 25 (ns) | 25 (ns) | 30 (ns) | Good |
| | | | 24.0 | 31.0 | 1.29 | 0.32 | | | | |
| Example 6 | 11.0 | 7.5 | 8.5 | 14.2 | 1.55 | 0.30 | 8.6 (%) | 7.8 (%) | 8.2 (%) | Good |
| Comparative Example 1 | 8.0 | Immeasurable | 14.0 | 20.0 | 0.80 | — | — | — | — | — |

This document claims priority and contains subject matter related to Japanese Patent Application No. 2003-301277 filed on Aug. 26, 2003 incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An information recording method, comprising:
   first irradiating an optical information recording medium comprising a phase change recording layer on a substrate having a guide groove with continuous light of a laser beam having an erase power level Pe to determine a transition linear velocity Vo defined as a minimum linear velocity, above which the following relationship is satisfied:

$Rr=Ra/Rb<1$, wherein Rr represents a reflection light intensity ratio, and Ra and Rb represent a reflection light intensity measured after and before the irradiation of the optical information recording medium with the continuous light, respectively; and then
   second irradiating the optical information recording medium with a laser beam, which is modulated by a pulse width modulation (PWM) system so as to have at least a recording power level Pw and the erase power level Pe, to form marks and spaces therebetween having a length of nT in the optical information recording medium by causing a phase change in the phase change recording layer, wherein n represents a natural number and T represents a basic clock cycle,
   wherein the erase power level Pe of the continuous light of the laser beam with which the medium is irradiated to determine the transition linear velocity Vo satisfies the following relationships:

$(Pwo/2) \leq Pe \leq (Pwo/2) \times 1.5$, wherein Pwo is an optimum recording power level for use in recording information with intensity modulated pulse patterns.

2. The information recording method according to claim 1, further comprising:
   performing trial recording in the optical information recording medium by an Optimum Power Control (OPC) method to determine an optimum recording power level Pwo of the modulated laser beam.

3. The information recording medium according to claim 1, wherein the first-mentioned irradiating comprises:
   irradiating a portion outside a data area of the optical information recording medium while a rotation speed of the optical information recording medium is changed to obtain the reflection light intensity ratio Rr at different linear velocities and thereby determine the transition linear velocity Vo.

4. The information recording method according to claim 1, wherein the first-mentioned irradiating comprises:
   irradiating an inner portion to a peripheral portion of the optical information recording medium while the optical information recording medium is rotated by a Constant Angular Velocity (CAV) system to obtain the reflection light intensity ratio Rr at different linear velocities and thereby determine the transition linear velocity Vo.

5. The information recording method according to claim 1, wherein the second-mentioned irradiation is performed at a linear velocity in a linear velocity range not above the transition linear velocity Vo.

6. The information recording method according to claim 1, wherein the second-mentioned irradiation is performed at a linear velocity in a linear velocity range above the transition linear velocity Vo.

7. The information recording method according to claim 1, wherein the second-mentioned irradiation is performed by a CAV system or a zone CAV (ZCAV) system at a linear velocity in a range including the transition linear velocity Vo, and wherein an erase power level ratio ϵ, which is a ratio of the erase power level Pe to the recording power level Pw, is changed at a linear velocity below the transition linear velocity Vo.

8. The information recording method according to claim 7, wherein the second-mentioned irradiation is performed while the following relationship is satisfied:

$\epsilon H/\epsilon L < 1$, wherein εH and εL are an erase power level ratio in a linear velocity range above the transition linear velocity Vo and an erase power level ratio in a linear velocity range below the transition linear velocity Vo, respectively.

9. The information recording method according to claim 1, wherein the linear velocity is changed based on preformatted information encoded in the optical information recording medium.

10. The information recording method according to claim 1, wherein the erase power level Pe of the laser beam in the first-mentioned irradiation is determined based on preformatted information encoded in the optical information recording medium.

11. An optical information recording medium, comprising:
   a substrate having a wobbling guide groove; and
   a phase change recording layer on the substrate,
   wherein the optical information recording medium contains encoded preformatted information on at least one of a test linear velocity range and a range of an erase power level Pe of continuous light for use in determining a transition linear velocity Vo defined as a minimum linear velocity, above which the following relationship is satisfied:

$Rr=Ra/Rb<1$, wherein Rr represents a reflection ratio, and Ra and Rb represent a reflection light intensity measured after and before the irradiation of the optical information recording medium with the continuous light, respectively, and
   wherein the erase power level Pe of the continuous light of the laser beam with which the medium is irradiated to determine the transition linear velocity Vo satisfies the following relationships:

$(Pwo/2) \leq Pe \leq (Pwo/2) \times 1.5$, wherein Pwo is an optimum recording power level for use in recording information with intensity modulated pulse patterns.

12. The optical information recording medium according to claim 11, wherein the preformatted information is encoded in the wobbling guide groove.

13. The optical information recording medium according to claim 12, wherein the preformatted information is recorded in the wobbling guide groove with phase modulation.

14. An information recording device, comprising:
   a rotation driving mechanism configured to rotate an optical information recording medium comprising a phase change recording layer on a substrate having a guide groove;
   a laser beam source configured to emit the laser beam irradiated on the optical information recording medium;
   a light source driving device configured to drive the laser beam source to emit the laser beam;
   a transition linear velocity measuring device configured to first irradiate the optical information recording medium with continuous light of a laser beam having an erase power level Pe to determine a transition linear velocity Vo defined as a minimum linear velocity while changing a linear velocity, above which the following relationship is satisfied:

$Rr=Ra/Rb<1$, wherein Rr represents a reflection ratio, and Ra and Rb represent a reflection light intensity measured after and before the irradiation of the continuous light on the optical information recording medium, respectively;
   a recording operation performing device configured to second irradiate the optical information recording medium with a laser beam, which is modulated by a pulse width modulation (PWM) system so as to have at least a recording power level Pw and an erase power level Pe, to form marks and spaces therebetween having a length of nT in the optical information recording medium by causing a phase change in the phase change recording layer, wherein n represents a natural number and T represents a basic clock cycle, while controlling a relative linear velocity between the optical information recording medium driven rotationally and the laser beam irradiated thereon and emission of the laser beam by the light source driving device according to PWM system; and
   a recording operation controlling device configured to control recording operation performance by the recording operation performing device according to the transition linear velocity Vo determined by the transition linear velocity measuring device,
   wherein the transition linear velocity measuring device controls the light source driving device so that the erase power level Pe of the continuous light of the laser beam with which the medium is irradiated to determine the transition linear velocity Vo satisfies the following relationships:

$(Pwo/2) \leq Pe \leq (Pwo/2) \times 1.5$, wherein Pwo is an optimum recording power level for use in recording information with intensity modulated pulse patterns.

15. The information recording device according to claim 14, further comprising:
   an Optimum Power Control (OPC) device to perform trial recording in the optical information recording medium by an Optimum Power Control (OPC) method prior to recording operation to determine the optimum recording power level Pwo of the modulated laser beam which is used by the transition linear velocity measuring device to specify the erase power level Pe.

16. The information recording device according to claim 14, wherein the transition linear velocity measuring device irradiates a portion outside a data area of the optical information recording medium while a rotation speed of the optical information recording medium is changed to obtain the reflection light intensity ratio Rr at different linear velocities and thereby determine the transition linear velocity Vo.

17. The information recording device according to claim 14, wherein the transition linear velocity measuring device irradiates an inner portion to a peripheral portion of the optical information recording medium while the optical information recording medium is rotated by a Constant Angular Velocity (CAV) system to obtain the reflection light intensity ratio Rr at different linear velocities and thereby determine the transition linear velocity Vo.

18. The information recording device according to claim 14, wherein the recording operation performing device controls the second-mentioned irradiation to be performed at a linear velocity in a linear velocity range not above the transition linear velocity Vo.

19. The information recording device according to claim 14, wherein the recording operation controlling device controls the second-mentioned irradiation to be performed at a linear velocity in a linear velocity range above the transition linear velocity Vo.

20. The information recording device according to claim 14, wherein the recording operation controlling device controls the second-mentioned irradiation to be performed by a CAV system or a zone CAV (ZCAV) system at a linear velocity in a range including the transition linear velocity Vo, and wherein an erase power level ratio $\epsilon$, which is a ratio of the erase power level Pe to the recording power level Pw, is changed at a linear velocity below the transition linear velocity Vo.

21. The information recording device according to claim 20, wherein the second-mentioned irradiation is performed while the following relationship is satisfied:

$$\epsilon H/\epsilon L < 1,$$

wherein $\epsilon H$ and $\epsilon L$ are an erase power level ratio in a linear velocity range above the transition linear velocity Vo and an erase power level ratio in a linear velocity range below the transition linear velocity Vo, respectively.

22. The information recording device according to claim 14, wherein the linear velocity is changed based on preformatted information encoded in the optical information recording medium.

23. The information recording device according to claim 14, wherein the erase power level Pe of the laser beam in the first-mentioned irradiation is determined based on preformatted information encoded in the optical information recording medium.

24. A computer readable medium embodying a program of recording information programmed to:

perform a transition linear velocity measuring process by first irradiating an optical information recording medium comprising a phase change recording layer on a substrate having a guide groove with continuous light of a laser beam having an erase power level Pe to determine a transition linear velocity Vo defined as a minimum linear velocity above which the following relationship is satisfied:

$$Rr=Ra/Rb<1,$$

wherein Rr represents a reflection light intensity ratio, and Ra and Rb represent a reflection light intensity measured after and before the irradiation of the optical information recording medium with the continuous light, respectively, with a computer in which the program is installed and which is contained in an information recording device which records information in the optical information recording medium by second irradiating the optical information recording medium with a laser beam, which is modulated by a pulse width modulation (PWM) system so as to have at least a recording power level Pw and the erase power level Pe, to form marks and spaces therebetween having a length of nT in the optical information recording medium by causing a phase change in the phase change recording layer, wherein n represents a natural number and T represents a basic clock cycle; and then perform a process of recording information in the optical information recording medium with the computer contained in the optical information recording device, wherein the erase power level Pe of the continuous light of the laser beam with which the medium is irradiated to determine the transition linear velocity Vo satisfies the following relationships:

$$(Pwo/2) \leq Pe \leq (Pwo/2) \times 1.5,$$

wherein Pwo is an optimum recording power level for use in recording information with intensity modulated pulse patterns.

25. An information recording device, comprising:

means for rotating an optical information recording medium comprising a phase change recording layer on a substrate having a guide groove;

means for emitting a laser beam to irradiate the optical information recording medium;

means for driving the means for emitting the laser beam;

means for first irradiating the optical information recording medium with continuous light of a laser beam having an erase power level Pe to determine a transition linear velocity Vo defined as a minimum linear velocity, above which the following relationship is satisfied:

$$Rr=Ra/Rb<1,$$

wherein Rr represents a reflection ratio, and Ra and Rb represent a reflection light intensity measured after and before the irradiation of the optical information recording medium with the continuous light, respectively;

means for second irradiating the optical information recording medium with a laser beam, which is modulated by a pulse width modulation (PWM) system so as to have at least a recording power level Pw and an erase power level Pe, to form marks and spaces therebetween having a length of nT in the optical information recording medium by causing a phase change in the phase change recording layer, wherein n represents a natural number and T represents a basic clock cycle, while controlling a relative linear velocity between the optical information recording medium driven rotationally and the laser beam irradiating the medium and emission of the laser beam by the means for driving the means for emitting the laser beam according to PWM system; and means for controlling recording operation performance by the means for second irradiating the optical information recording medium according to the transition linear velocity Vo determined by the means for first irradiating the optical information recording medium, wherein the transition linear velocity measuring device controls the light source driving device so that the erase power level Pe of the continuous light of the laser beam with which the medium is irradiated to determine the transition linear velocity Vo satisfies the following relationships:

$$(Pwo/2) \leq Pe \leq (Pwo/2) \times 1.5,$$

wherein Pwo is an optimum recording power level for use in recording information with intensity modulated pulse patterns.

* * * * *